US006995262B1

(12) United States Patent
Deroover et al.

(10) Patent No.: US 6,995,262 B1
(45) Date of Patent: Feb. 7, 2006

(54) USE OF ACYLSULFONAMIDO-SUBSTITUTED POLYMETHINE DYES AS FLUORESCENE DYES AND/OR MARKERS

(75) Inventors: Geert Deroover, Lier (BE); Michael Missfeldt, Edegem (BE); Lydia Simon, Wülfrath (DE)

(73) Assignee: Bayer CropScience AG, Leverkusen (DE)

( * ) Notice: Subject to any disclaimer, the term of this patent is extended or adjusted under 35 U.S.C. 154(b) by 23 days.

(21) Appl. No.: 10/048,775

(22) PCT Filed: Jul. 24, 2000

(86) PCT No.: PCT/EP00/07070

§ 371 (c)(1),
(2), (4) Date: Mar. 15, 2002

(87) PCT Pub. No.: WO01/11370

PCT Pub. Date: Feb. 15, 2001

(30) Foreign Application Priority Data

Aug. 5, 1999 (DE) ......................................... 199 37 024

(51) Int. Cl.
*C09B 23/00* (2006.01)
*G01N 33/58* (2006.01)

(52) U.S. Cl. ..................... 544/300; 544/208; 544/212; 544/327; 546/99; 546/101; 546/104; 546/171; 546/172; 546/176; 546/269.7; 546/271.7; 546/274.4; 546/293; 548/121; 548/150; 548/156; 548/170; 548/180; 548/181; 548/217; 548/364.1; 548/364.4; 548/427; 548/455; 548/467; 548/505; 548/542; 548/546; 435/6; 435/40.5

(58) Field of Classification Search .................. 544/208, 544/212, 300, 327; 546/99, 101, 104, 171, 546/172, 176, 269.7, 271.7, 274.4, 293; 548/121, 548/150, 156, 170, 180, 181, 217, 364.1, 548/364.4, 427, 455, 467, 505, 542, 546; 435/6, 40.5; 436/86, 172, 800
See application file for complete search history.

(56) References Cited

U.S. PATENT DOCUMENTS 5,268,486 A * 12/1993 Waggoner et al. .......... 548/427

5,876,915 A * 3/1999 Deroover et al. ........... 430/619
5,958,667 A * 9/1999 Deroover et al. ........... 430/584

FOREIGN PATENT DOCUMENTS

| DE | 1081311 | * | 5/1960 |
| DE | 3912046 | * | 3/1990 |
| EP | 0 530 511 B1 | | 3/1993 |
| EP | 0 534 283 B1 | | 3/1993 |
| EP | 638841 | * | 2/1995 |
| EP | 779540 | * | 6/1997 |
| WO | WO 96/00902 | | of 1996 |
| WO | WO 97/13810 | | 4/1997 |
| WO | WO-9713810 | * | 4/1997 |
| WO | WO 97/40104 | | 10/1997 |
| WO | WO-9931181 | * | 6/1999 |

OTHER PUBLICATIONS

Mujumdar, et al., *Cyanine Dye Labeling Reagents: Sulfoindocyanine Succinimidyl Esters*, Bioconjugate Chemistry, vol. 4, No. 2, Mar./Apr. 1993, pp. 105–111.

Smith, Michael B. and March, Jerry, *Reactions, Mechanisms, and Structure*, March's Advanced Organic Chemistry, Fifth Ed., table of contents, p. 17, p. 238 (publication date unknown).

Bradford, Marion M., *A Rapid and Sensitive Method for the Quantitation of Microgram Quantities of Protein Utilizing the Principle of Protein–Dye Binding*; Analytical Biochemistry, vol. 72, pp. 248–254 (1976).

* cited by examiner

*Primary Examiner*—Fiona T. Powers
(74) *Attorney, Agent, or Firm*—Connolly Bove Lodge & Hutz LLP

(57) ABSTRACT

The invention relates to a novel polymethine dyes containing at least one acylsulfonamido group of the formula (I)

$$\diagup (CH_2)_n \diagdown Y \diagup \overset{H}{N} \diagdown A \diagup R \quad (I)$$

in which n, Y, A and R have the meaning given in the claims, and at least one compound of the formulae (a) to (n) given in the claims. The polymethine dyes according to the invention are suitable for use as dyes and/or labels, in particular for staining or labeling biomolecules.

5 Claims, 1 Drawing Sheet

USE OF ACYLSULFONAMIDO-SUBSTITUTED POLYMETHINE DYES AS FLUORESCENE DYES AND/OR MARKERS

In recent years, more and more sensitive and easy to handle detection methods have been developed which are used, in particular, in biotechnology where only small amounts of substance are available for an analysis. Here, for example, fluorescent detection methods are finding increasingly widespread use. The fluorescent dyes are used as labels to label biological substances such as proteins, DNA, RNA, carbohydrates, fats or entire cells. However, because many of the substances to be labeled for their part have fluorescent properties in the range from 400 to 500 nm, the dyes used for labeling should absorb at wavelength above 500 nm, usually in a range between 500 and 1,200 nm. Moreover, in this wavelength region, inexpensive laser diols are available as light sources.

The fluorescent dyes known from the prior art are frequently substituted by hydrophilic or acidic groups to ensure solubility in water at neutral or slightly basic pH. This facilitates the labeling of biological material which is operational mainly in aqueous medium. Moreover, the dyes should be photostable to allow even measurement methods which comprise relatively long irradiation. However, many of the dyes which absorb at a relatively long wavelength do not have sufficient photostability.

The dyes are bound covalently or else by absorption to the biological samples. The sulfhydryl groups and free amino groups of proteins, for example, are reactive radicals which allow covalent coupling a dye molecule. Furthermore, hydrophilic or lipophilic dyes can add themselves by absorption to the hydrophilic and hydrophobic domains of the proteins. It is also possible for ionic dyes to be absorbed to proteins by ionic interactions.

The cyanine dyes (Waggoner et al. Bioconjugate Chemistry, 4, 105–111, (1993), U.S. Pat. No. 5,268,486, WO 97/13810) which have hitherto frequently been used in bioassays tend to form aggregates. In addition to the monomer, H aggregates and J aggregates may from, depending on the chemical environment (for example pH) of the dye. This is exploited in photography, since the absorptions of the aggregates are shifted hypsochromically or bathochromically compared to the absorption of the monomer. However, for biolabeling, this aggregation effect is undesirable since here, too, one or more additional absorption bands result.

Frequently, multiplex assays are carried out where samples labeled with different dyes are excited at different wavelengths. To achieve a satisfactory separation of excitation and emission signals, the absorptions of the dye conjugates must not overlap. Here, a sharp, reproducible and pH- and solvent-independent absorption of the dyes is important. The tendency of the frequency used cyanine dyes to form aggregates furthermore reduces the intensity of the fluorescence by quenching. The emitted radiation is either directly reabsorbed, or there are radiationless energy losses.

The dyes known from the prior art for biolabeling, i.e. the cyanine dyes, are a class of the polymethines. In addition, WO 97/40104 discloses, for example, squaric acid derivatives as dyes for biolabeling.

It was an object of the present invention to provide novel fluorescent dyes as fluorescent labels or dyes for staining having improved properties compared to the cyanine dyes known from the prior art. In particular, solubility in biological buffer systems and photostability were to be improved and, in particular, the tendency to form aggregates to be reduced. However, at the same time, the compounds according to the invention were also to have a high quantum yield and a higher extinction coefficient.

Figure 1:
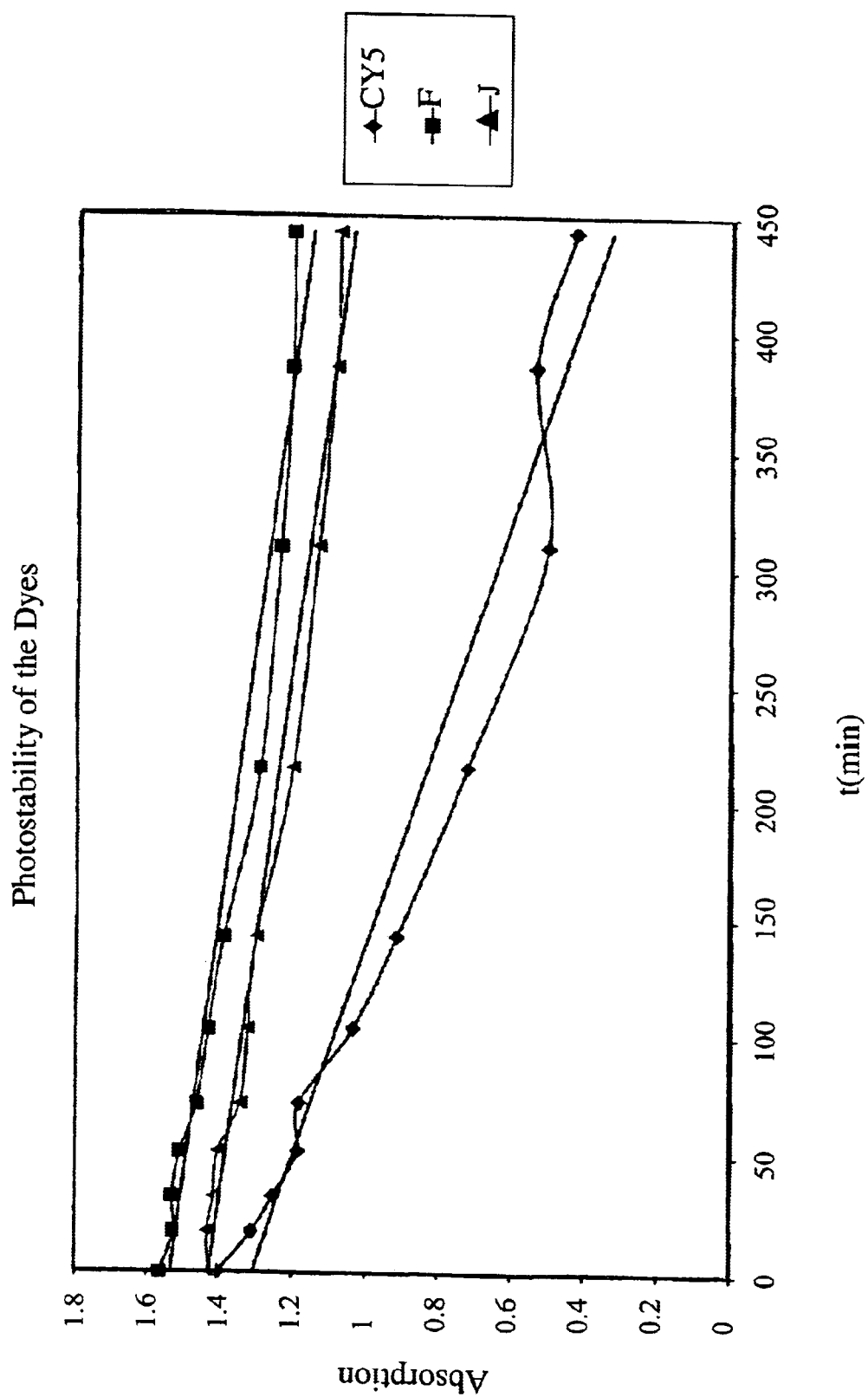
FIG. 1 is a graph showing the photostability of three dyes tested in the Examples.

The present invention provides polymethine dyes containing at least one acylsulfonamido group according to formula (I)

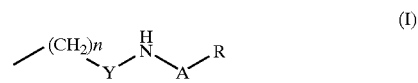

in which n represents 1, 2, 3, 4, 5, 6, 7 or 9

Y, A represent electron-withdrawing radicals, preferably C=O, —SO2—, and

R represents an optionally substituted alkyl or aryl radical and containing at least one compound of the formulae below:

(a)

(b)

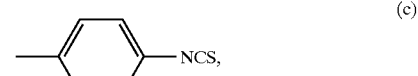
(c)

(d)

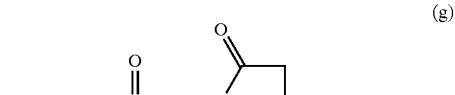
(g)

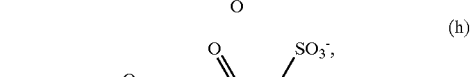
(h)

(i)

(j)

(k)

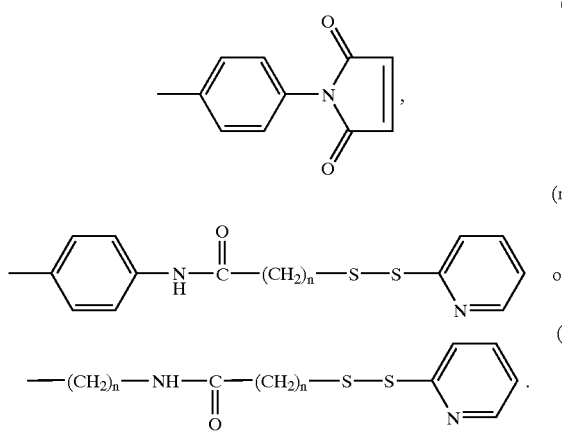

The present invention furthermore provides the use of polymethine dyes containing at least one acrylsulfonamido group according to formula (I) for staining and/or biolabeling of biomolecules.

Polymethine dyes according to the invention which are to be used not only for staining but also for biolabeling by forming a covalent bond have, in addition to a group of the formula (I), additionally at least one group capable of forming such a covalent bond; according to the invention, such groups are preferably

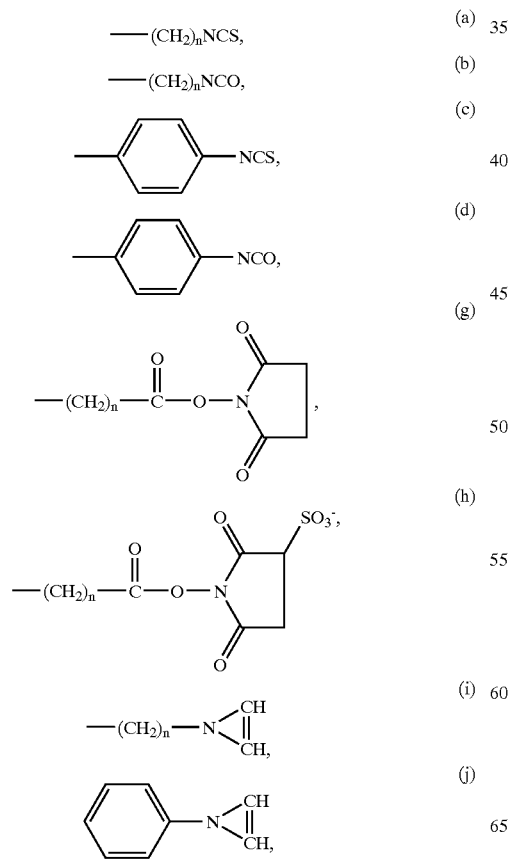

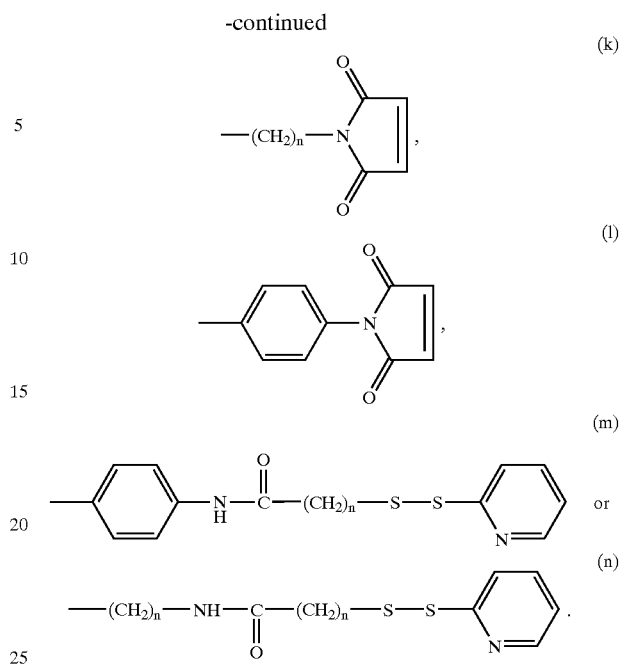

Accordingly, the present invention furthermore provides the use of polymethine dyes containing at least one acylsulfonamido group according to formula (I) and at least one grouping capable of forming a covalent bond selected from the list of the following compounds:

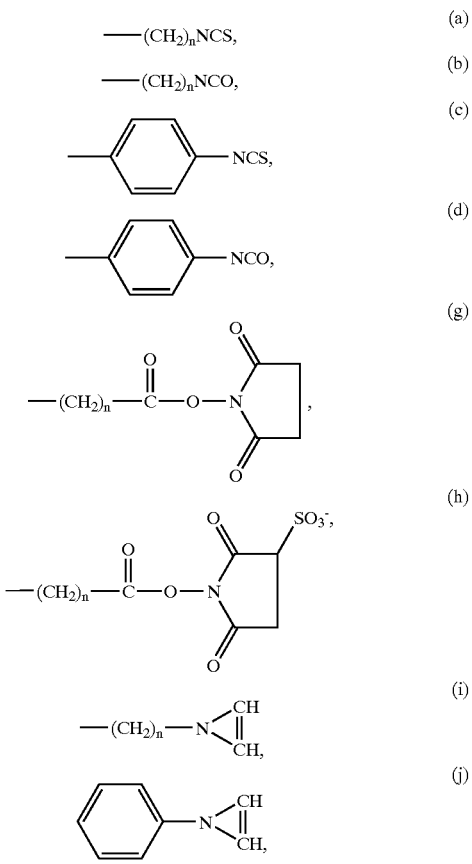

-continued (k) —(CH₂)ₙ—N(maleimide), (l) —C₆H₄—N(maleimide), (m) —C₆H₄—NH—C(O)—(CH₂)ₙ—S—S—(2-pyridyl) or (n) —(CH₂)ₙ—NH—C(O)—(CH₂)ₙ—S—S—(2-pyridyl)

for labeling biomolecules by covalent binding.

For the purpose of the present application, biomolecules are to be understood as meaning proteins and also DNA and/or RNA. Moreover, for the purpose of the present application, cells, too, may be considered as biomolecules. Also included are small organic molecules having biological action.

Polymethine dyes, which, in addition to a compound of the formula (I), additionally have a group selected from one of the formulae (a) to (n) are hitherto not known in the prior art and represent novel compounds. They are suitable, in particular, for biolabeling, as they are capable of forming covalent bonds.

For the purpose of the present application, an electron-withdrawing group is preferably to be understood as meaning, unless described otherwise, groups as described in March, Advanced Organic Chemistry, 3rd Ed., p. 17 and p. 238.

For the purpose of the present application, alkyl is, unless defined otherwise, to be understood as meaning linear or branched, cyclic or straight-chain, substituted or unsubstituted hydrocarbons. These are in particular alkyl groups having 1 to 12 C atoms, such as, for example, methyl ethyl, propyl, isopropyl, butyl, t-butyl, neopentyl and 2-ethylhexyl groups. However, these can be substituted further, particularly preferably by a carboxycarbonyl group.

For the purpose of the present application, aryl is, unless defined otherwise, to be understood as meaning aromatic hydrocarbon groups, preferably 5- or 6-membered ring systems, which may be present in monocyclic from or else as condensed ring systems. These can be either substituted or else unsubstituted ring systems. Particular preference is given, for example, to phenyl and naphthyl groups.

Surprisingly, it has been found that, when the dyes according to the invention are used in biological systems, such as, for example, in protein conjugates or in biological buffer media, the tendency of the polymethines to aggregates could be reduced considerably compared to cyanines or cyanines or squaric acid dyes with alkylsulfonates or alkylcarboxylates, as described in the patents U.S. Pat. No. 5,268,486, WO 96/00902, WO 97/13810 and WO 97/40104.

A further advantage of the dyes to be used according to the invention is the fact that the chromogenic properties of the polymethines are not changed by the substituent. Hitherto, for example, the functionality for an improved solubility of the cyanine dyes has been realized by introducing sulfo groups into the aryl system which is part of the chromophore. This also resulted in a shift of the spectral properties, since the substituents had electron-withdrawing effects. The spectral properties of unsubstituted arylcyanines have been described and it is thus possible, by introducing the acylsulfonic acid radical, to adapt the dye system directly for use in a bioassay, for example. Thus, time-consuming optimization and screening experiments can be dispensed with.

Furthermore, compared to alkylcarboxylates, the dyes having acylsulfonamido groups have a high extinction coefficient. This results in a further advantage when the dye is used as a label:

If the dyes are bound covalently as a label, for example to a protein or an antibody, the conjugate is characterized by the molar dye/protein content ratio. In order to obtain a satisfactory signal, a certain amount of dye has to be bound to the protein. The higher the extinction coefficient of the dye and thus its intensity, the higher the sensitivity of the dye as a fluorescent label, since the intensity of the fluorescence at absorptions <0.05 is a function of the extinction coefficient.

$F = \phi K I_o \epsilon c d$ $\phi$=quantum yield $I_o$=intensity of the light with which the sample is irradiated $\epsilon$=extinction coefficient $c$=concentration of the sample $d$=path length However, since dyes quench when they are spatially close, the dye/protein ratio should not be too high. This would result in a loss of fluorescence intensity. Accordingly, dyes having high extinction coefficients are particularly suitable for use as fluorescent labels. Even small amounts of dye give an intensive fluorescence signal at a low molar dye/protein content ratio. Also, quench processes are minimized.

Suitable polymethine dyes to be used according to the invention are, in particular, cyanine dyes, merocyanines, rhodacyanines, styrene dyes, squaric acid dyes and the crotonic acid dyes, as described hereinbelow in more detail in preferred embodiments, which are all characterized in that, for the use according to the invention, they have at least one substituent according to the formula (I). In a further embodiment, the polymethine dyes of the formula (I) to (5) may also be attached to one another, it being possible for both two or more identical or else different dyes to be attached to one another. Preferred polymethine dyes according to the invention are those of the formulae shown below which, in addition to a substituent of the formula (I), contain additionally at lest one substituent selected from the group of the compounds below:

(a) —(CH₂)ₙNCS, (b) —(CH₂)ₙNCO, (c) —C₆H₄—NCS,

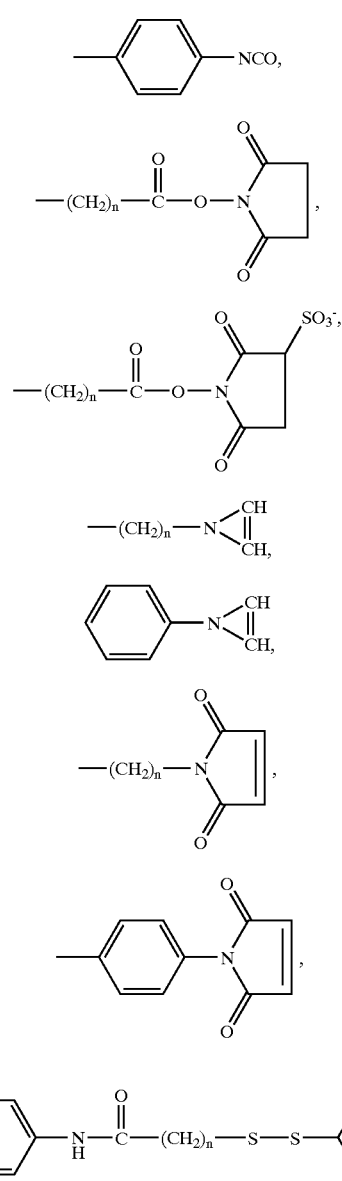

(d) 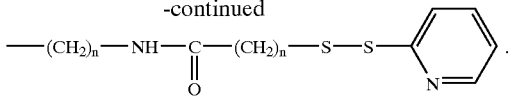

(g)

(h)

(i)

(j)

(k)

(l)

(m)

(n)

1. Cyanine Dyes

According to the invention, suitable cyanine dyes are in particular those of the formulae 1a, 1b and/or 1c Formula 1-a

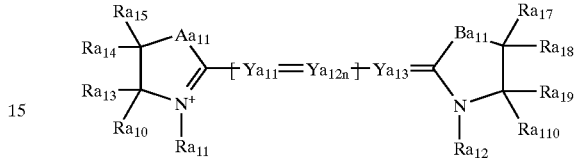

in which $Ra_{10}$ to $Ra_{110}$ independently of one another may represent any substituent, n represents 0, 1, 2, 3 or 4, $Ya_{11}$, $Ya_{12}$ and $Ya_{13}$ independently of one another may represent substituted or unsubstituted C or N, where the substituents may also form a 5- or 6-membered aliphatic or aromatic carbo- or heterocycle, and $Aa_{11}$ and $Ba_{11}$ independently of one another represent O, S, Se, T, N-$Ra_{111}$, C($Ra_{112}$)($Ra_{113}$) or —C($Ra_{114}$)=C($Ra_{115}$)—, where $Ra_{11}$ to $Ra_{115}$ independently of one another represent H, optionally substituted alkyl, optionally substituted aryl or optionally substituted alkenyl having up to 20 C atoms, with the proviso that at least one of the substituents Ra10 to Ra115 is selected from the group consisting of —$(CH_2)_1$—$SO_2$—Z—$SO_2$—R, —$(CH_2)_1$—CO—Z—$SO_2$—R, —$(CH_2)_1$—$SO_2$—Z—CO—R and —$(CH_2)_1$—N(R)—$SO_3^-$, where 1 is a number between 1 and 6, Z represents NH or N⁻ and R preferably represents optionally substituted alkyl or aryl, Particularly preferred compounds of formula 1a to be used according to the invention are listed below Preferred compounds of the formula 1a I-a1

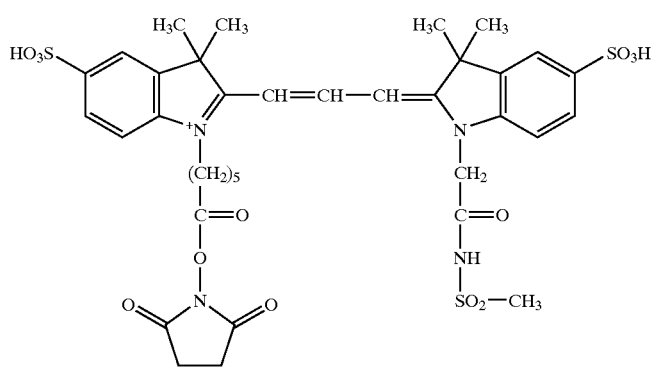

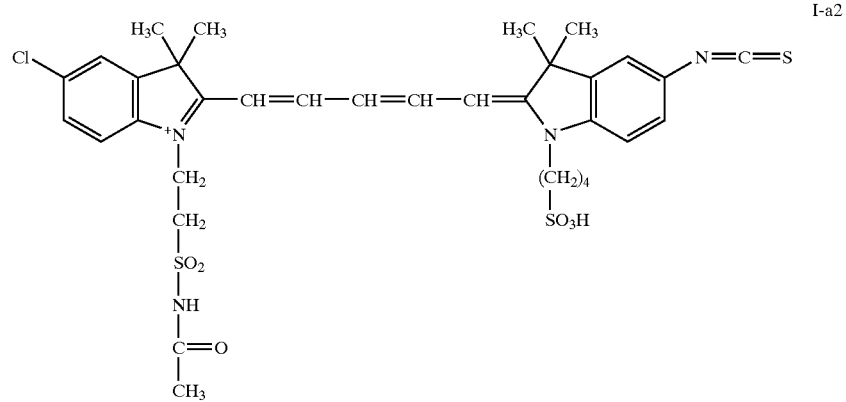
I-a2
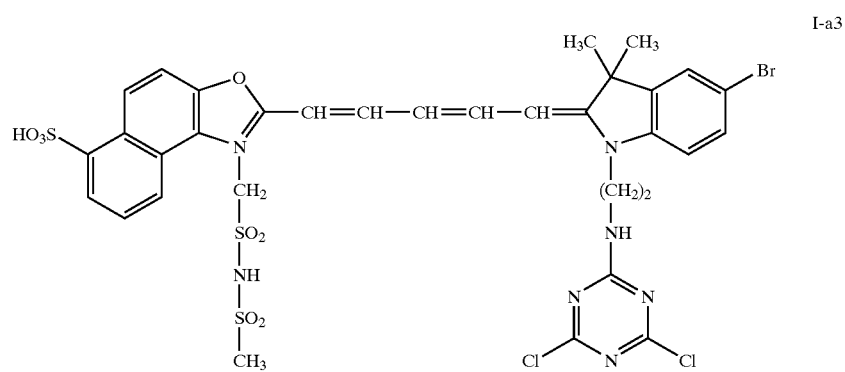
I-a3
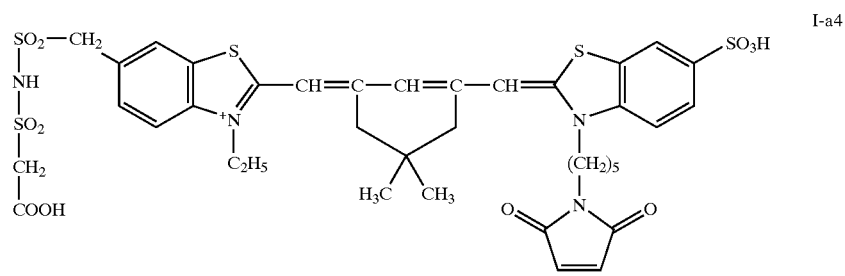
I-a4
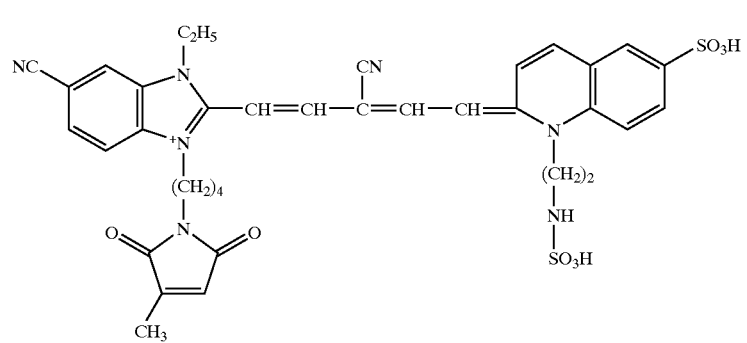
I-a5

-continued

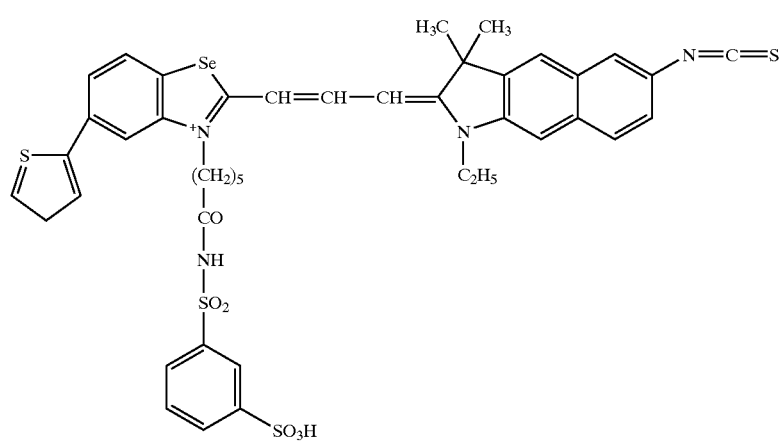

I-a6

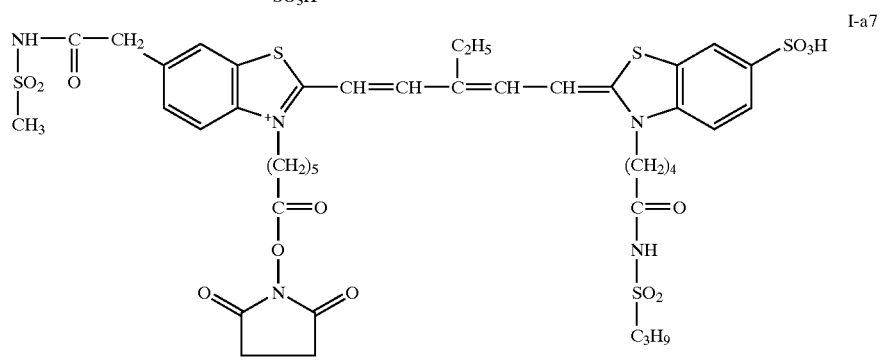

I-a7

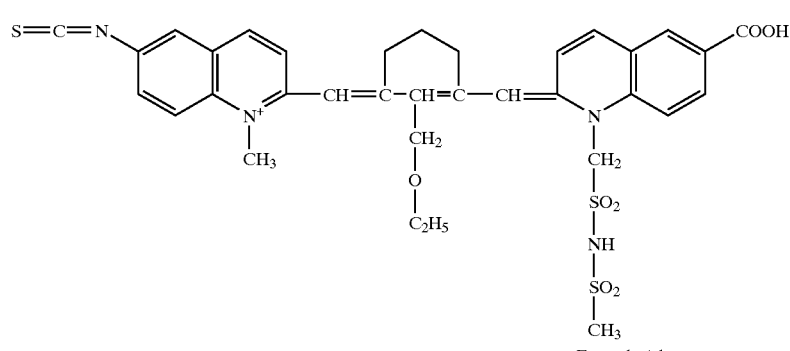

I-a8

Formula 1-b

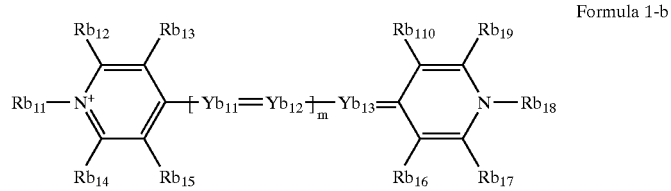

in which $Rb_{10}$ to $Rb_{110}$ independently of one another may represent any substituent, m represents 0, 1, 2, 3, or 4 and $Yb_{11}$, $Yb_{12}$ and $Yb_{13}$ independently of one another may represent substituted or unsubstituted C or N, where the substituents may also form a 5- or 6-membered aliphatic or aromatic carbo- or heterocycle, with the proviso that at least one of the substituents $Rb_{11}$ to $Rb_{110}$ is selected from the group consisting of $-(CH_2)_i-SO_2-Z-SO_2-R$, $-(CH_2)_1-CO-Z-SO_2-$, $-(CH_2)_1-SO_2-Z-CO-R$ and $-(CH_2)_1-N(R)-SO_3^-$, where 1 represents a number between 1 and 6, Z represents NH or $N^-$ and R preferably represents optionally substituted alkyl or aryl.

In a preferred embodiment, the following substituents form a 5- or 6-membered carbo- or heterocycle which is optionally also fused:

The substituent $Rb_{11}$ together with $Rb_{12}$ and/or $Rb_{14}$, the substituent $Rb_{12}$ together with $Rb_{13}$ and/or $Rb_{11}$, the substituent $Rb_{14}$ together with $Rb_{15}$ and/or $Rb_{11}$, the substituent $Rb_{18}$ together with $Rb_{19}$ and/or $Rb_{17}$, the substituent $Rb_{17}$ together with $Rb_{16}$ and/or $R_{18}$, the substituent $Rb_{19}$ together with $R_{110}$ and/or $Rb_{18}$.

Particularly preferred compounds of the formula 1b

I-b1
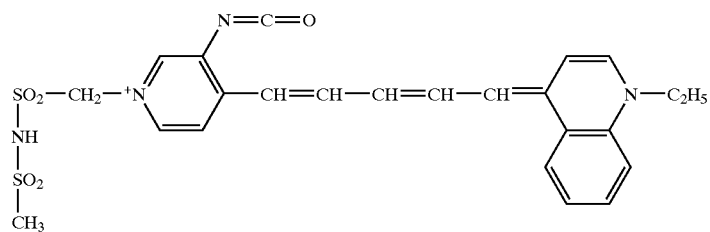
I-b2
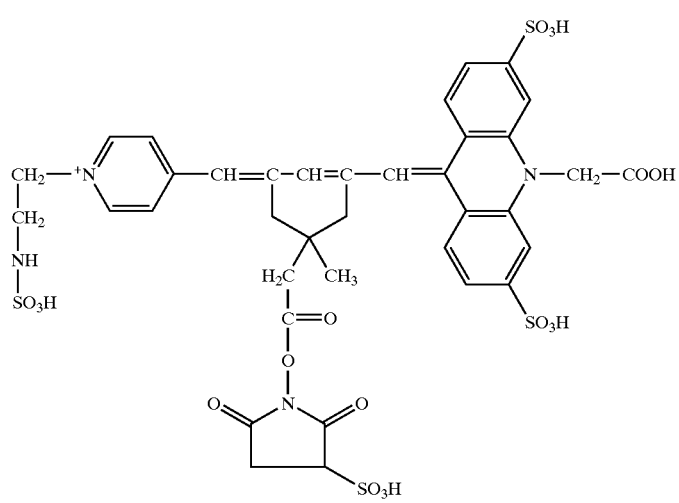
I-b3
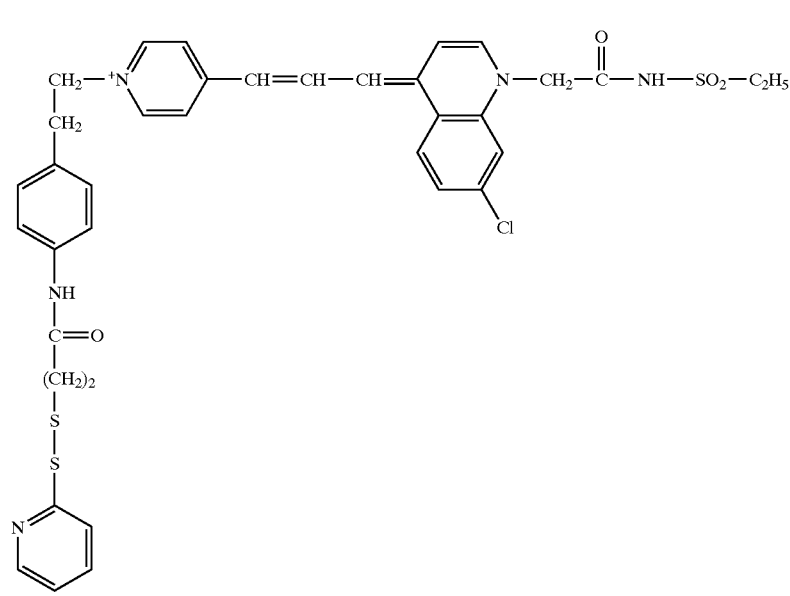
I-b4
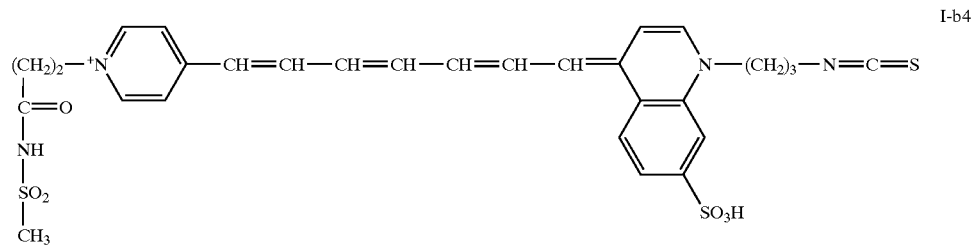

-continued

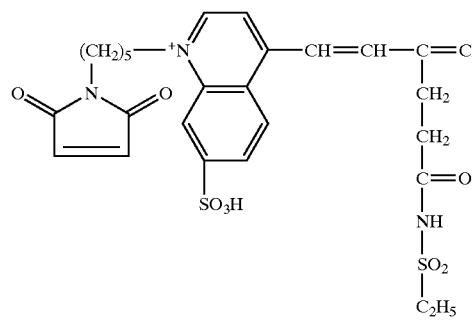
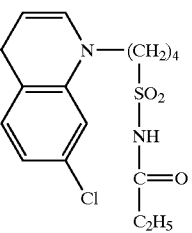

I-b5

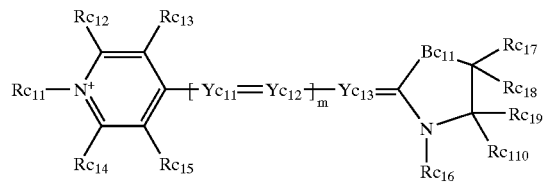

Formula 1-c in which
Rc$_{11}$ to Rc$_{110}$ independently of one another may represent any substituent,
m represents 0, 1, 2, 3 or 4,
Yc$_{11}$, Yc$_{12}$, and Yc$_{13}$ independently of one another may represent substituted or unsubstituted C or N, where the substituents may also form a 5- or 6-membered aliphatic or aromatic carbo- or heterocycle.
and
Bc$_{11}$ represents O, S, Se, Te, N-Rc$_{111}$, C(Rc$_{112}$)(Rc$_{113}$) or —C(Rc$_{114}$)=C(Rc$_{115}$)—, where Rc$_{11}$ to Rc$_{115}$ independently of one another may represent H, optionally substituted alkyl, optionally substituted aryl or optionally substituted alkenyl having up to 20 C atoms, with the proviso that at least one of the substituents Rc10 to Rc115 is selected from the groups consisting of —(CH$_2$)$_1$—SO$_2$—Z—SO$_2$—R, —(CH$_2$)$_1$—CO—Z—SO$_2$—R, —(CH$_2$)$_1$—SO$_2$—Z—CO—R and —(CH$_2$)$_1$—N(R)—SO$_3^-$, where
1 represents a number 1 and 6,
Z represents NH or N$^-$ and
R preferably represents optionally substituted alkyl or aryl.

In a preferred embodiment, the following substituents form a 5- or 6-membered carbo- or heterocycle which is optionally also fused;

The substituent Rc$_{11}$ together with Rc$_{12}$ and/or Rc$_{14}$, the substituent Rc$_{12}$ together with Rc$_{13}$ and/or Rc$_{11}$, the substituent Rc$_{14}$ together with Rc$_{15}$ and/or Rc$_{11}$.

The substituents Rc$_{17}$ to Rc$_{110}$ may preferably form the remaining members of a carbo- or heterocyclic ring system which may contain up to 4 rings which may optionally carry a plurality of substituents. Rc$_{18}$ together with Rc$_{19}$ may form a π bond and Rc$_{17}$ and Rc$_{110}$ may represent substituents.

Particularly preferred compounds of the formula 1c

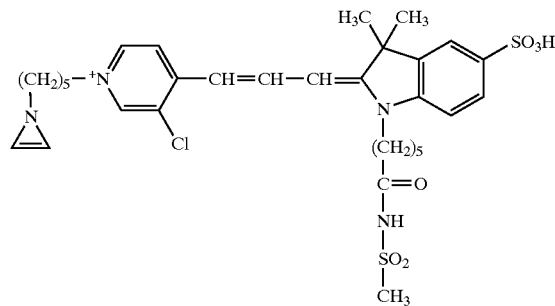

I-c1

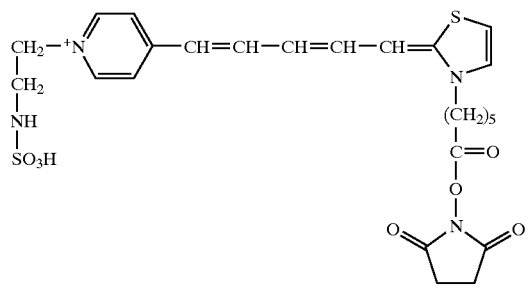

I-c2

I-c3
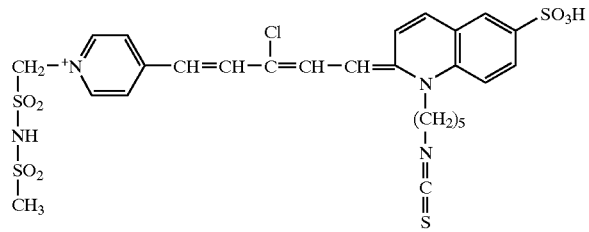

I-c4
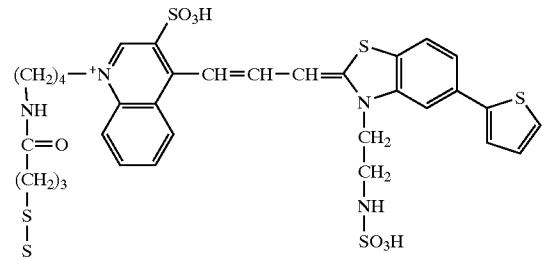

I-c5
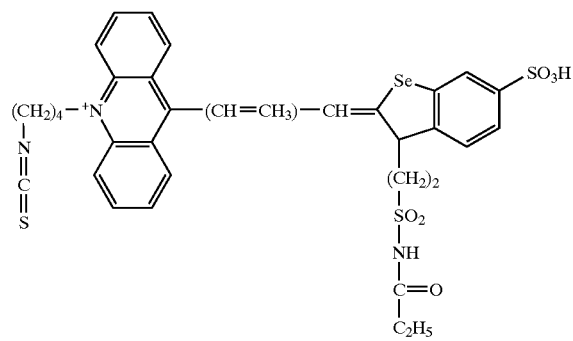

I-c6
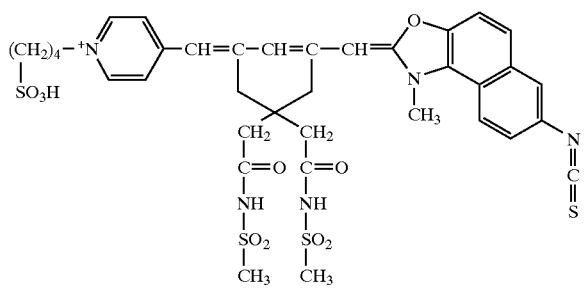

2. Merocyanines

Particularly suitable for the purpose of the present invention are merocyanines according to formulae 2a and/or 2b Formula 2a
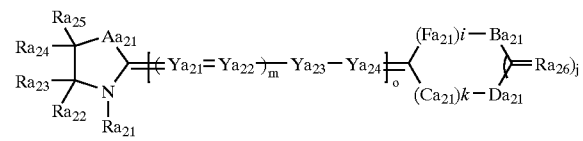

in which $Ra_{21}$ and $Ra_{25}$ independently of one another represents any substituent, $Ya_{21}$, $Ya_{22}$, $Ya_{23}$, $Ya_{24}$ independently of one another represent substituted or unsubstituted C or N, where the substituents may also form a 5- or 6-membered aliphatic or aromatic carbo- or heterocycle.

m represents 0, 1, 2, 3, 4 o represents 0, 1, 2

$Fa_{21}$ and $Ca_{21}$ independently of one another represent C=O, C=S or $C(Ra_{27})=$, $Ba_{21}$ and $Da_{21}$ independently of another represent optionally substituted C, N, O or S, $Ra_{26}$ represents O, S, or a further heterocyclic, optionally substituted, 5- or 6-membered ring k, i and j independently of one another represent 0 or 1

$Ra_{27}$, represents H or optionally substituted alkyl or aryl, $Aa_{21}$ represents O, S, Se, Te, N-$Ra_{28}$, $C(Ra_{29})(Ra_{210})$, —$C(Ra_{211})=C(Ra_{212})$—, where $Ra_{28}$ to $Ra_{212}$ may represent H or optionally substituted alkyl, aryl, or alkenyl having up to 20 C atoms, with the proviso that at least one of the substituents $Ra_{21}$ to $Ra_{25}$ or $Ra_{27}$ to $Ra_{212}$ is selected from the group consisting of —$(CH_2)_1$—$SO_2$—Z—$SO_2$—R, —$(CH_2)_1$—CO—Z—$SO_2$—R, —$(CH_2)_1$—$SO_2$—Z—CO—R and —$(CH_2)_1$—N(R)—$SO_3^-$, where 1 represents a number between 1 and 6, Z represents NH or $N^-$ and R preferably represents optionally substituted alkyl or aryl.

The substituents $Ra_{22}$ to $Ra_{25}$ preferably form the remaining members of a carbo- or heterocyclic ring system which may contain up to 4 rings which may optionally carry a plurality of substituents. $Ra_{22}$ together with $Ra_{25}$ may form a π bond and $Ra_{23}$ and $Ra_{24}$ may represent substituents.

Particularly preferred compounds of the formula 2a

II-a1
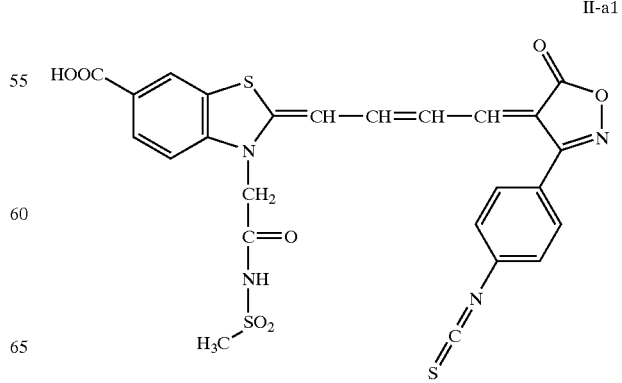

-continued

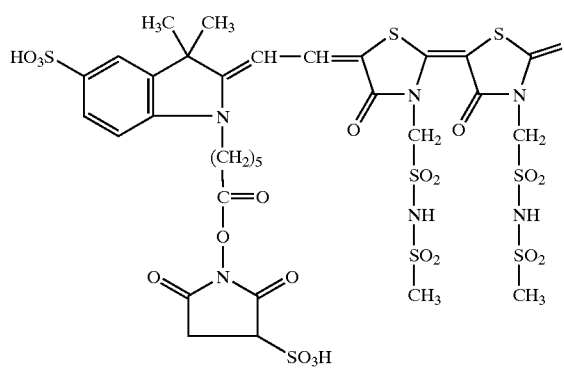
II-a2

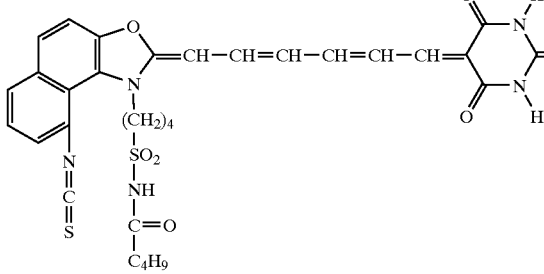
II-a3

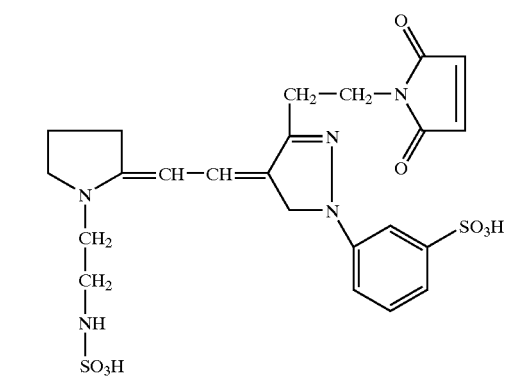
II-a4

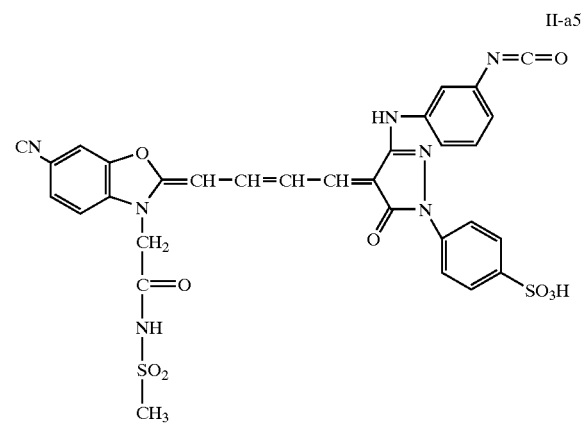
II-a5

-continued

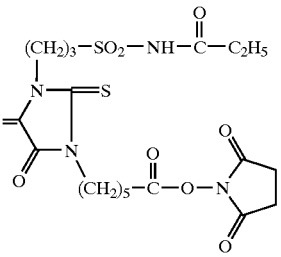
II-a6

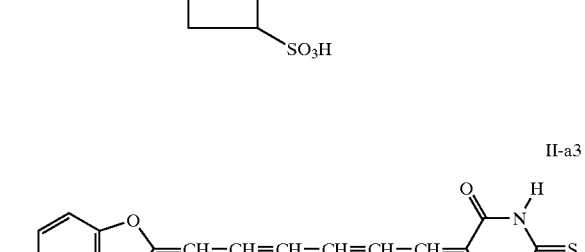
II-a7

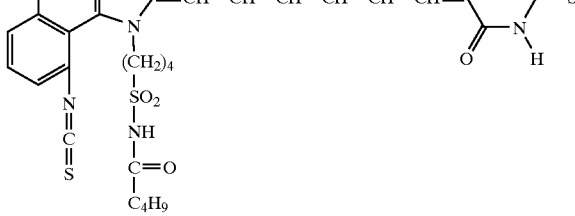
II-a8

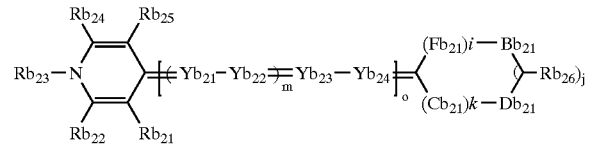
Formula 2-b in which
Rb$_{21}$ to Rb$_{25}$ independently of one another represent any substituent, Yb$_{21}$, Yb$_{22}$, Yb$_{23}$, Yb$_{24}$ independently of one another represent substituted or unsubstituted C or N, where the substituents may also form a 5- or 6-membered aliphatic or aromatic carbo- or heterocycle.

m represents 0, 1, 2, 3 or 4 o represents 0, 1, 2, 3 or 4

Fb$_{21}$ and Cb$_{21}$ independently of one another C=O, C=S or C(Rb$_{27}$)=,

Bb$_{21}$ and Db$_{21}$ independently of one another represents optionally substituted C, N, O or S, Rb$_{26}$ represents O, S, or a further heterocyclic, optionally substituted, 5- or 6-membered ring k, i, and j independently of one another represent 0 or 1

Rb$_{27}$ represents H or optionally substituted alkyl or aryl,

The following substituents may preferably form a 5- or 6-membered carbo- or heterocycle which is optionally also fused:

The substituent $Rb_{23}$ together with $Rb_{24}$ and/or $Rb_{22}$, the substituent $Rb_{22}$ together with $Rb_{21}$ and/or $Rb_{23}$, the substituent $Rb_{24}$ together with $Rb_{25}$ and/or $Rb_{23}$.

$Ab_{21}$: O S, Se, Te, N—$Rb_{28}$, $C(Rb_{29})(Rb_{210})$, —$C(Rb_{211})$=$C(Rb_{212})$—, $Rb_{28}$ to $Rb_{212}$ may be hydrogen, optionally substituted alkyl or optionally substituted aryl, optionally substituted alkenyl, having up to 20 C atoms, or one of the substituents listed below, with the proviso that at least one of the substituents $Rb_{21}$ to $Rb_{25}$ or $Rb_{27}$ to $Rb_{212}$ is selected from the group consisting of —$(CH_2)_l$—$SO_2$—Z—$SO_2$—R, —$(CH_2)_l$—CO—Z—$SO_2$—R, —$(CH_2)_l$—$SO_2$—Z—CO—R and —$(CH_2)_l$—N(R)—$SO_3^-$, where l represents a number between 1 and 6, Z represents NH or $N^-$ and R preferably represents optionally substituted alkyl or aryl.

Particularly preferred compounds of the formula 2b

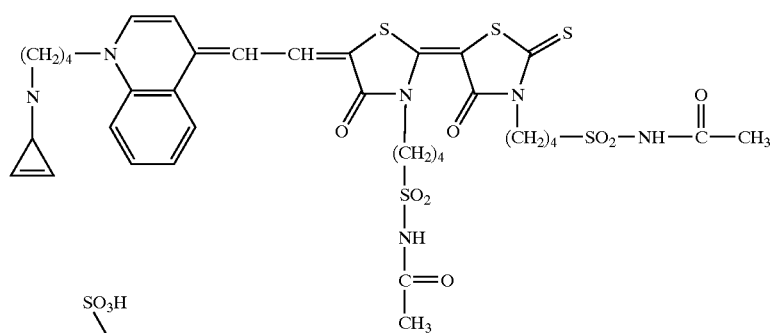
II-b1

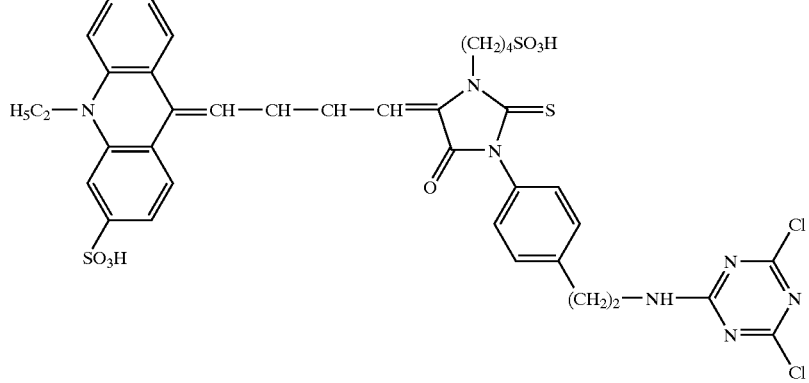
II-b2

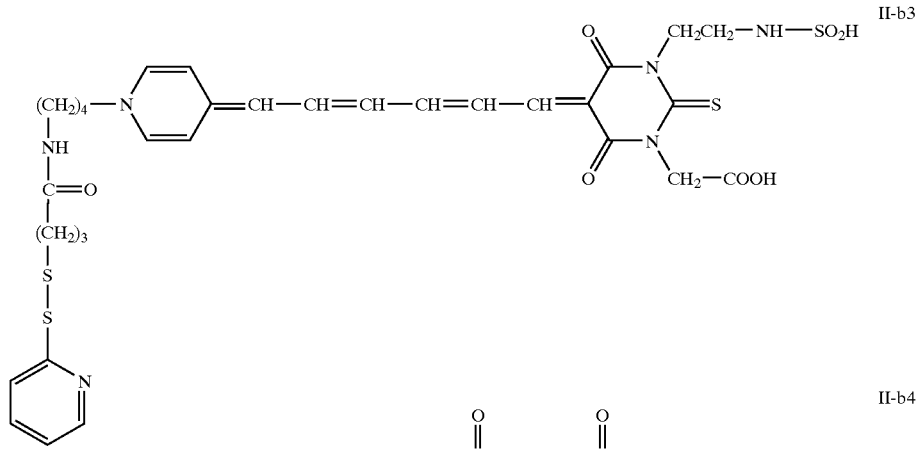
II-b3

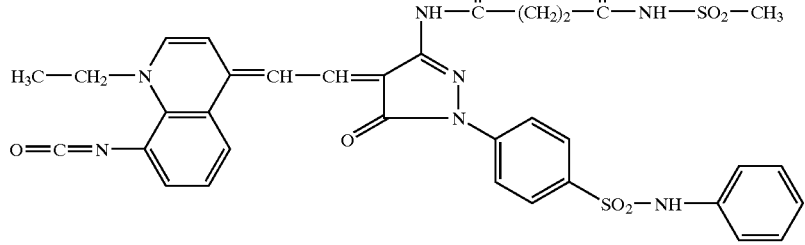
II-b4

I-b5
Rhodacyanines

For the purpose of the present application, the rhodacyanines used are in particular those of the formula 3a and/or 3b.

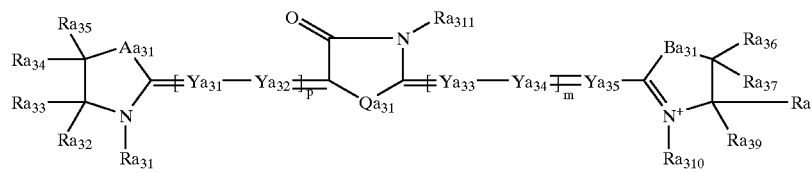

Formula 3-a in which

- $Ra_{31}$ to $Ra_{311}$ independently of one another represent any substituent,
- $Ya_{31}$, $Ya_{32}$, $Ya_{33}$, $Ya_{34}$, $Ya_{35}$ independently of one another represent substituted or unsubstituted C or N, where the substituents may also form a 5- or 6-membered aliphatic or aromatic carbo- or heterocycle,
- p and r independently of one another represent 0, 1 or 2
- $Qa_{31}$ represents O; $N(Ra_{312})$, S or Se
- $Aa_{31}$, $Ba_3$ independently of one another represent O, S, Se, Te, N—$Ra_{313}$, $C(Ra_{314})(Ra_{315})$ or —$C(Ra_{316})$=C($Ra_{317}$) where $Ra_{312}$ to $Ra_{317}$ may represent H, optionally substituted alkyl, aryl or alkenyl, having up to 20 C atoms, or any substituent.

with the proviso that at least one of the substituents $Ra_{31}$ to $Ra_{317}$ is selected from the group consisting of —$(CH_2)_l$—$SO_2$—Z—$SO_2$—R, —$(CH_2)_l$—CO—Z—$SO_2$—R, —$(CH_2)_l$—$SO_2$—Z—CO—R and —$(CH_2)_l$—N(R)—$SO_3^-$, where

- l represents a number between 1 and 6,
- Z represents NH or $N^-$ and
- R preferably represents optionally substituted alkyl or aryl.

In a preferred embodiment, the substituents $Ra_{32}$ to $Ra_{35}$ or $Ra_{36}$ to $Ra_{39}$ form the remaining members of a carbo- or heterocyclic ring system which may contain up to 4 rings which may optionally carry a plurality of substituents. $Ra_{32}$ together with $Ra_{35}$ and/or $Ra_{36}$ together with $Ra_{39}$ may form a π bond and $Ra_{33}$ and $Ra_{34}$ or $Ra_{37}$ and $Ra_{38}$ may represent substituents.

Particularly preferred compounds of the formula 3a

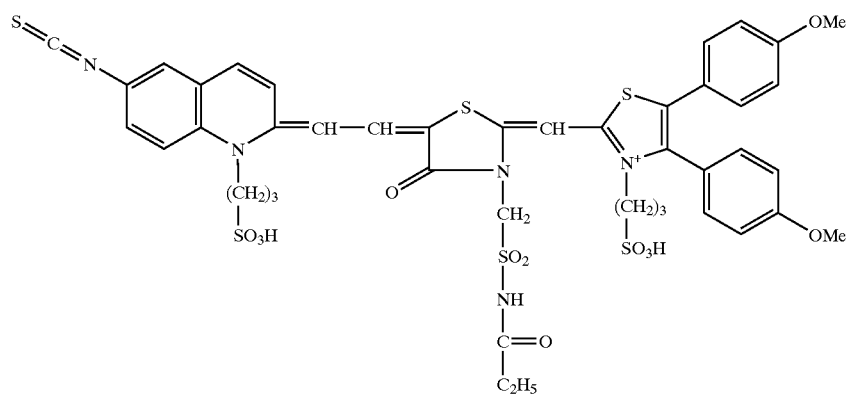

III-a1

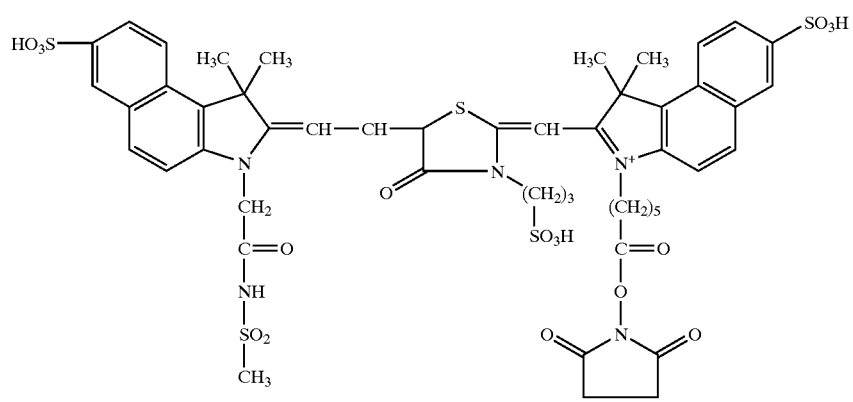

III-a2

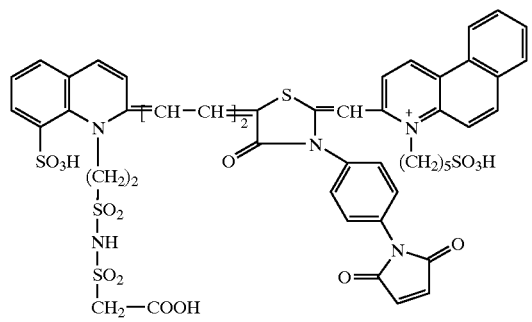

III-a3

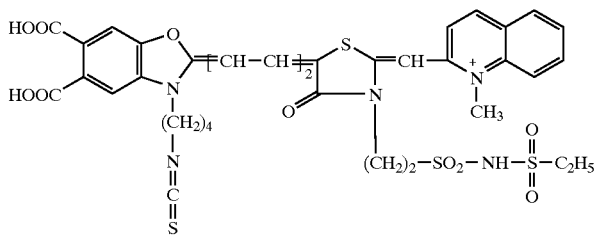

III-a4

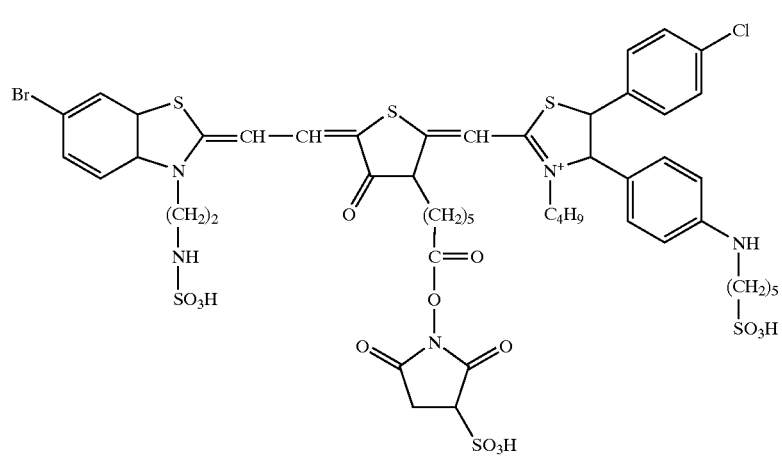

III-a5

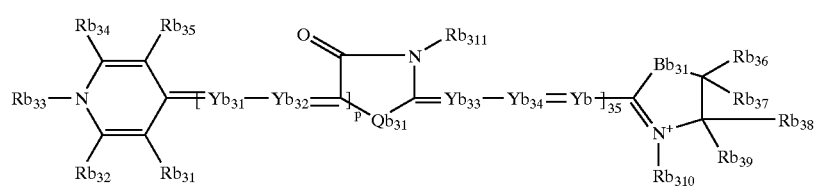

Formula 3-b in which

Rb$_{31}$ to Rb$_{311}$ independently of one another represent any substituent,

Yb$_{31}$, Yb$_{32}$, Yb$_{33}$, Yb$_{34}$, Yb$_{35}$ independently of one another represent substituted or unsubstituted C or N, where the substituents may also form a 5- or 6-membered aliphatic or aromatic carbo- or heterocycle, p and r independently of one another represent 0, 1 or 2

Qb$_{31}$ represents O; N(Rb$_{312}$), S or Se

Ab$_{31}$, Bb$_{31}$ independently of one another represent O, S, Se, Te, N—Rb$_{313}$, C(Rb$_{314}$)(Rb$_{315}$) or —C(Rb$_{316}$)=C(Rb$_{317}$), where Rb$_{311}$ to Rb$_{317}$ may represent H, optionally substituted alkyl, aryl or alkenyl, having up to 20 C atoms, or any substituent, with the proviso that at least one of the substituents Rb$_{31}$ to Rb$_{317}$ is selected from the group consisting of —(CH$_2$)$_l$—SO$_2$—Z—SO$_2$—R, —(CH$_2$)$_l$—CO—Z—SO$_2$—R, —(CH$_2$)$_l$—SO$_2$—Z—CO—R and —(CH$_2$)$_l$—N(R)—SO$_3^-$, where l represents a number between 1 and 6, Z represents NH or N$^-$ and R preferably represents optionally substituted alkyl or aryl.

In a preferred embodiment, the substituents Rb$_{36}$ to Rb$_{39}$ form the remaining members of a carbo- or heterocyclic ring system which may contain up to 4 rings which may optionally carry a plurality of substituents. Rb$_{36}$ together with Rb$_{39}$ may form a π bond and Ra$_{37}$ and Ra$_{38}$ may represent substituents. The following substituents may form a 5- or 6-membered carbo- or heterocycle which is optionally also fused:

The substituent Rb$_{33}$ together with Rb$_{32}$ and/or Rb$_{34}$, the substituent Rb$_{32}$ together with Rb$_{33}$ and/or Rb$_{31}$, the substituent Rb$_{34}$ together with Rb$_{35}$ and/or Rb$_{33}$.

Particularly preferred compounds of the formula 3b

III-b1
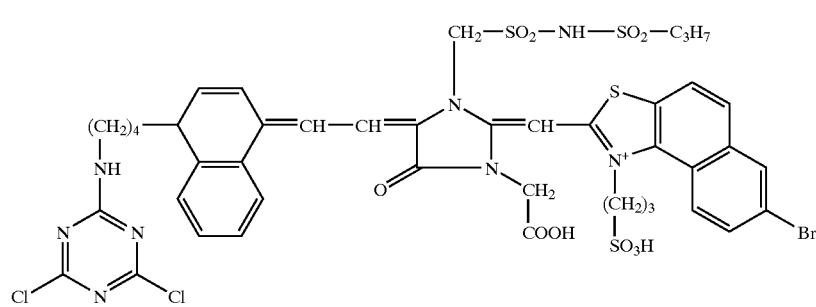
III-b2
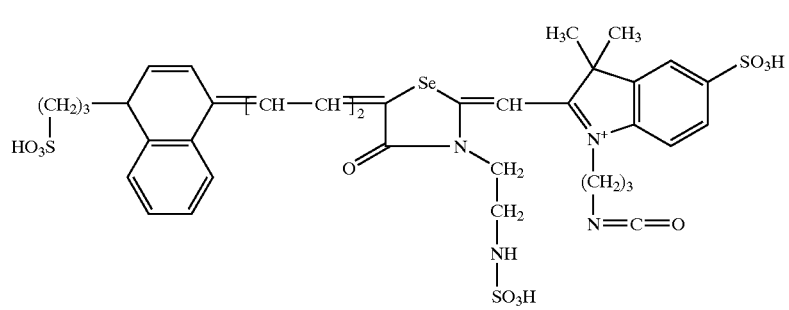
III-b3
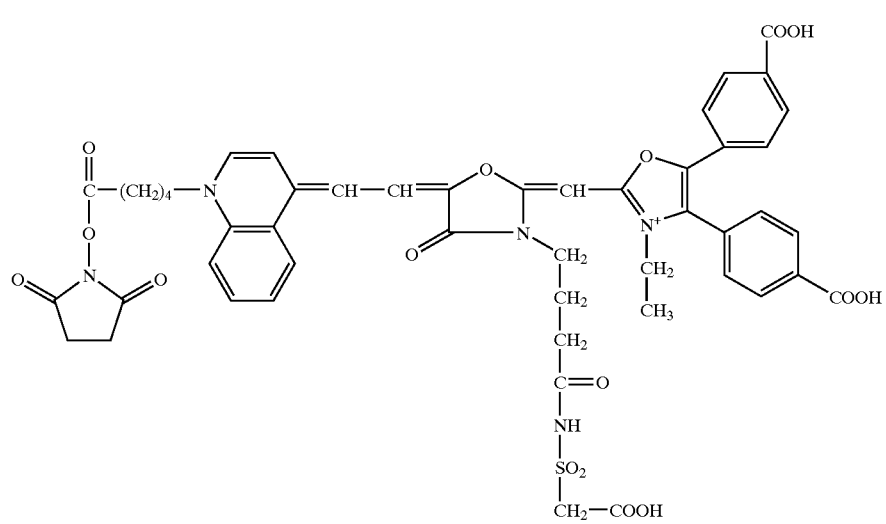
III-b4
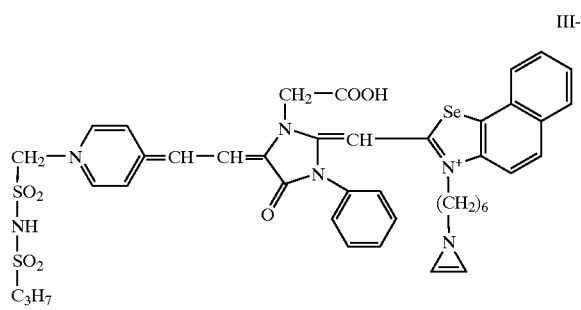
III-b5
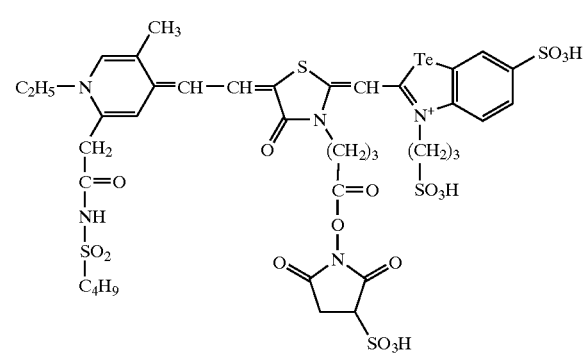

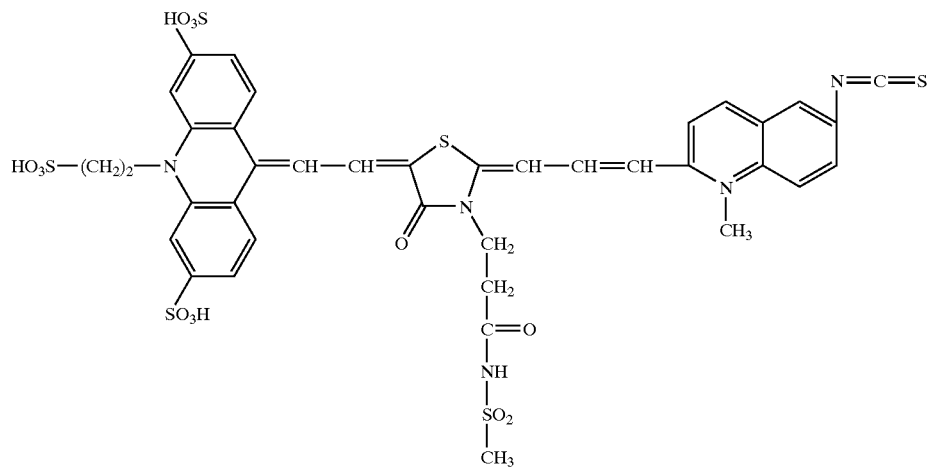

III-b6

Styryl Dyes

Styryl dyes which are to be used particularly preferably for the purpose of the present invention are the compounds of the formula 4a, 4b, 4c and/or 4d.

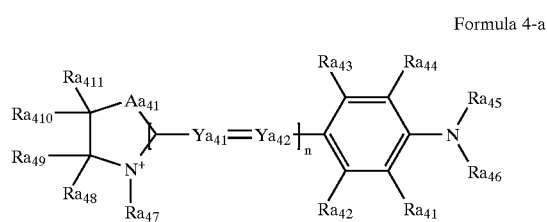

Formula 4-a in which

- $Ra_{41}$ to $Ra_{411}$ independently of one another represent any substituent,
- $Ya_{41}$ and $Ya_{42}$ independently of one another represent substituted or unsubstituted C or N, where the substituents may also form a 5- or 6-membered aliphatic or aromatic carbon- or heterocycle.
- $Aa_4$ represents O, S, Se, Te, N—$Ra_{412}$, $C(Ra_{413})(Ra_{414})$ or —$C(Ra_{415})$=$C(Ra_{416})$—, where $Ra_{412}$ to $Ra_{416}$ may represent H, optionally substituted alkyl, aryl, or alkenyl, having up to 20 carbon atoms, or any substituent,
- with the proviso that at least one of the substituents $Ra_{41}$ to $Ra_{416}$ is selected from the group consisting of —$(CH_2)_l$—$SO_2$—Z—$SO_2$—R, —$(CH_2)_l$—CO—Z—$SO_2$—R, —$(CH_2)_l$—$SO_2$—Z—CO—R and —$(CH_2)_l$—N(R)—$SO_3^-$, where

- l represents a number between 1 and 6,
- Z represents NH or $N^-$ and
- R preferably represents optionally substituted alkyl or aryl.

In a preferred embodiment, the substituents $Ra_{48}$ to $Ra_{411}$ form the remaining members of a carbo- or heterocyclic ring system which may contain up to 4 rings which may optionally carry a plurality of substituents. $Ra_{48}$ together with $Ra_{411}$ may form a π bond and $Ra_{49}$ and $Ra_{410}$ may represent substituents.

The following substituents may form a 5- or 6-membered carbo- or heterocycle which is optionally also fused:

The substituent $Ra_{45}$ together with $Ra_{46}$ or $Ra_{45}$ with $Ra_{44}$, or $Ra_{46}$ with $Ra_{41}$, and/or $Ra_{41}$ with $Ra_{42}$ and/or $Ra_{44}$ with $Ra_{43}$.

Particularly preferred compounds of the formula 4a

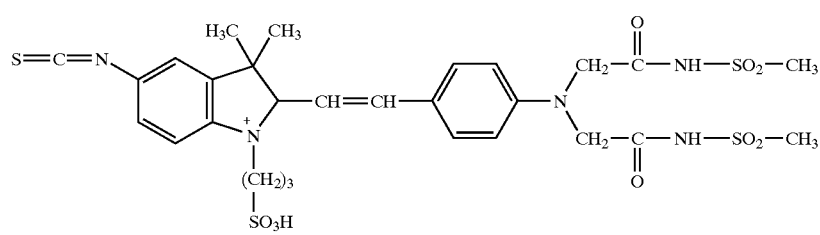

IV-a1

-continued
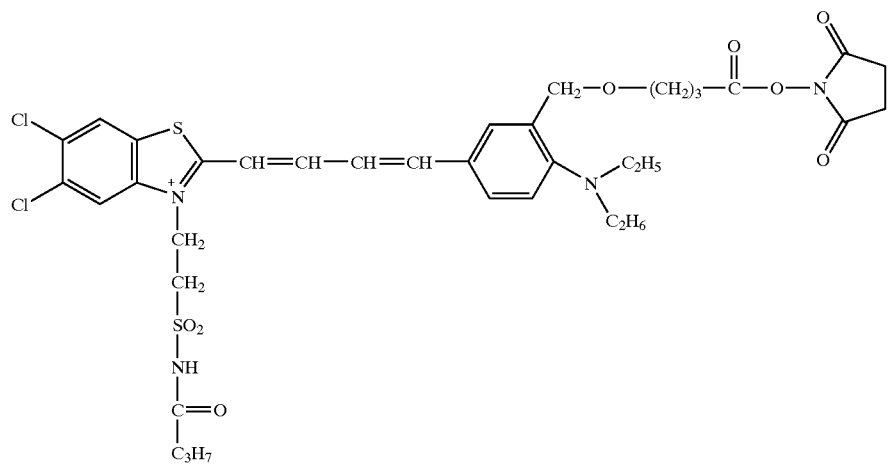
IV-a2
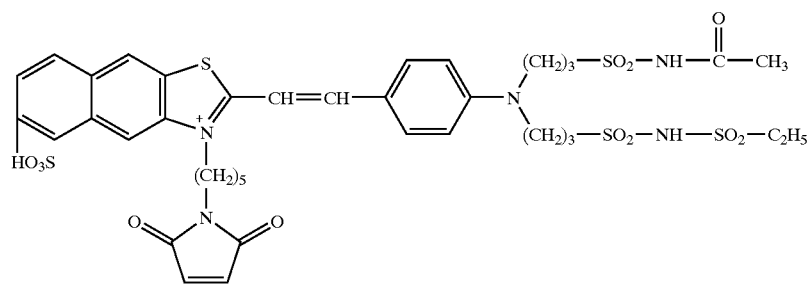
IV-a3
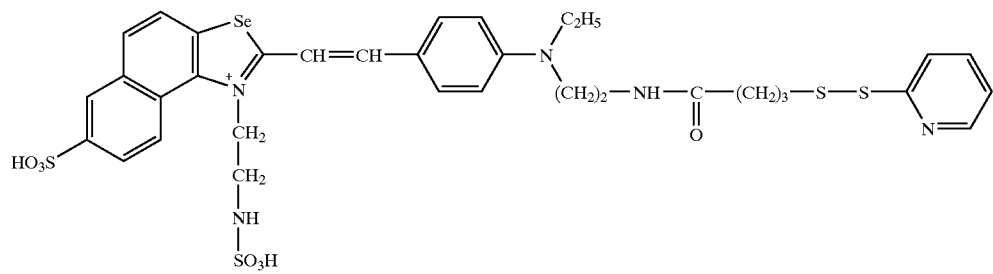
IV-a4
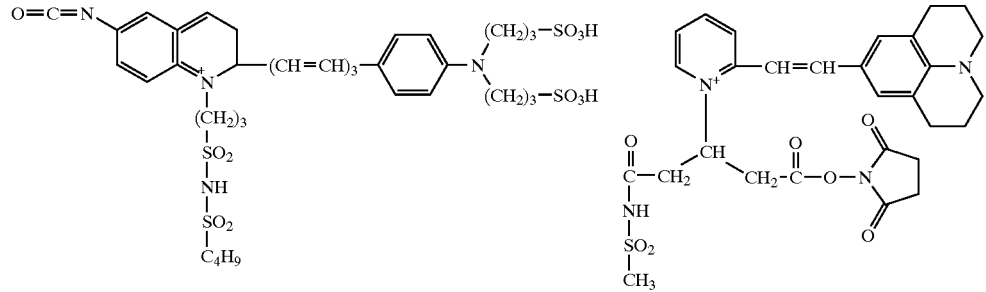
IV-a5
IV-a6
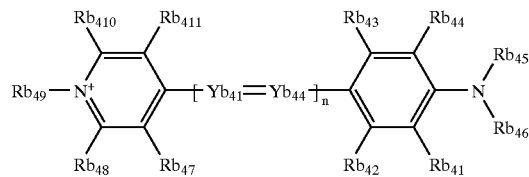
Formula 4-B
in which
$Ra_{41}$ to $Ra_{411}$ independently of one another represent any substituent,
$Yb_{41}$ and $Yb_{42}$ independently of one another substituted or substituted C or N, where the substituents may also form a 5- or 6-membered aliphatic or aromatic carbo- or heterocycle and n represents 0, 1, 2, 3, 4 or 5, with the proviso that at least one of the substituents $Rb_{41}$ to $Rb_{411}$ is selected from the group consisting of —$(CH_2)_l$—$SO_2$—Z—$SO_2$—R, —$(CH_2)_l$—CO—Z—$SO_2$—R, —$(CH_2)_l$—$SO_2$—Z—CO—R and —$(CH_2)_l$—N(R)—$SO_3^-$, where l represents a number between 1 and 6, Z represents NH or $N^-$ and R preferably represents optionally substituted alkyl or aryl.

In a preferred embodiment, the following substituents form a 5- or 6-membered carbo- or heterocycle which is optionally also fused:

The substituent $Rb_{45}$ together with $Rb_{46}$ and/or $Rb_{45}$ with $Rb_{44}$, and/or $Rb_{46}$ with $Rb_{41}$, and/or $Rb_{41}$ with $Rb_{42}$ and/or $Rb_{44}$ with $Rb_{43}$.

The substituent $Rb_{49}$ together with $Rb_{410}$ and/or $Rb_{48}$, the substituent $Rb_{410}$ together with $Rb_{411}$ and/or the substituent $Rb_{48}$ together with $Rb_{47}$.

Particularly preferred compounds of the formula 4b

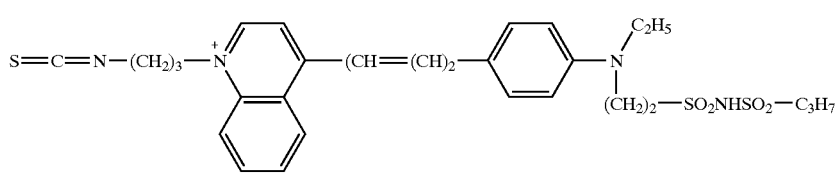

IV-b1

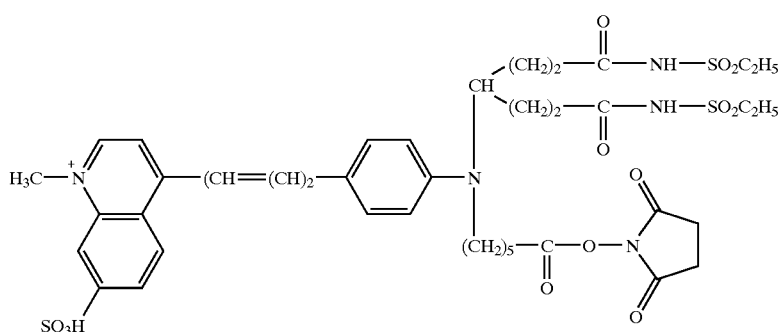

IV-b2

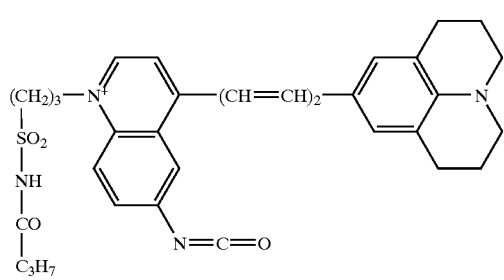

IV-b3

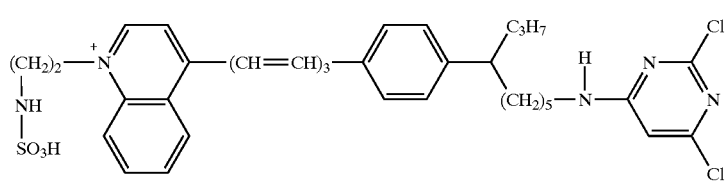

IV-b4

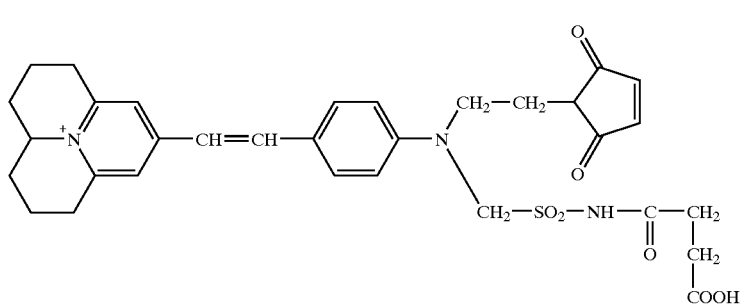

IV-b5

Formula 4-c

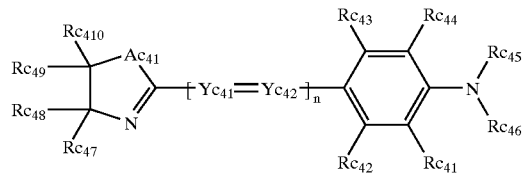

in which

Rc$_{41}$ to Rc$_{410}$ independently of one another represent any substituent,

Yc$_{41}$ and Yc$_{42}$ independently of one another substituted or unsubstituted C or N, where the substituents may also form a 5- or 6-membered aliphatic or aromatic carbo- or heterocycle, Ac$_{41}$ represents O, S, Se, Te, N—Rc$_{411}$, C(Rc$_{412}$)(Rc$_{413}$) or —C(Rc$_{414}$)=C(Rc$_{415}$)—, where Rc$_{411}$ to Rc$_{415}$ may represent H, optionally substituted alkyl, aryl, or alkenyl, having up to 20 C atoms, or any substituent and n may represent 0, 1, 2, 3, 4 or 5, with the proviso that at least one of the substituents Rc$_{41}$ to Rc$_{415}$ is selected from the group consisting of —(CH$_2$)$_l$—SO$_2$—Z—SO$_2$—R, —(CH$_2$)$_l$—CO—Z—SO$_2$—R, —(CH$_2$)$_l$—SO$_2$—Z—CO—R and —(CH$_2$)$_l$—N(R)—SO$_3^-$, where l represents a number between 1 and 6, Z represents NH or N$^-$ and R preferably represents optionally substituted alkyl or aryl.

In a preferred embodiment, the following substituents may form a 5- or 6-membered carbo- or heterocycle which is optionally also fused:

The substituent Rc$_{45}$ together with Rc$_{46}$ or Rc$_{45}$ with Rc$_{44}$, or Rc$_{46}$ with Rc$_{41}$, and/or Rc$_{41}$ with Rc$_{42}$ and/or Rc$_{44}$ with Rc$_{43}$ The substituents Rc$_{47}$ to Rc$_{410}$ form the remaining members of a carbo- or heterocyclic ring system which may contain up to 4 rings which may optionally carry a plurality of substituents. Rc$_{47}$ together with Rc$_{410}$ may form a π bond and Rc$_{48}$ and Rc$_{49}$ may represent substituents.

Compounds of the formula 4c which are to be used with particular preference

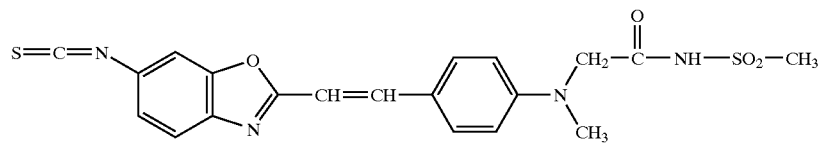

IV-c1

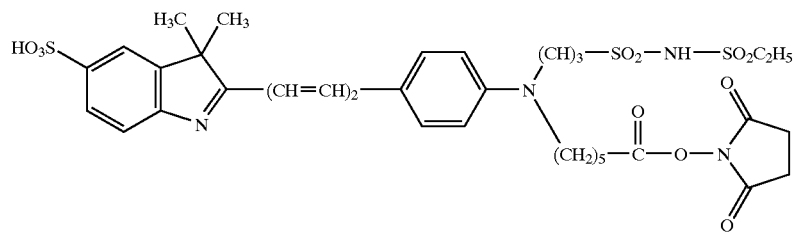

IV-c2

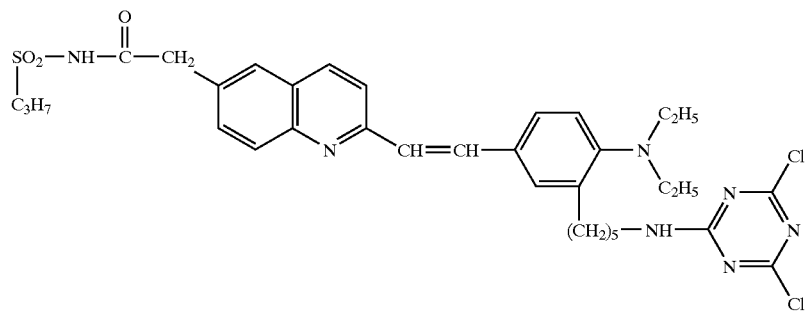

IV-c3

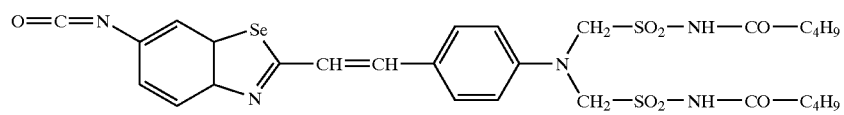

IV-c4

-continued

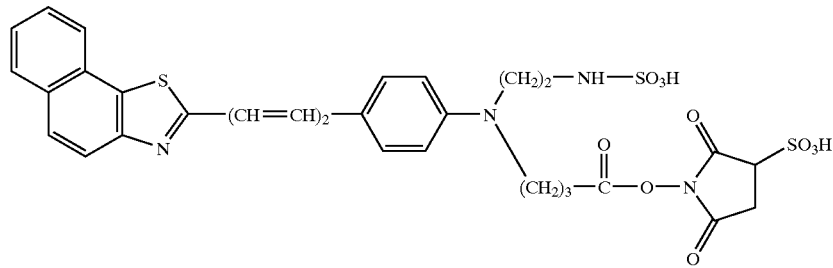

IV-c5

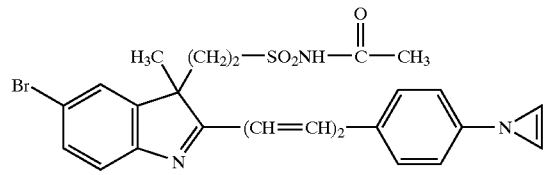

IV-c6

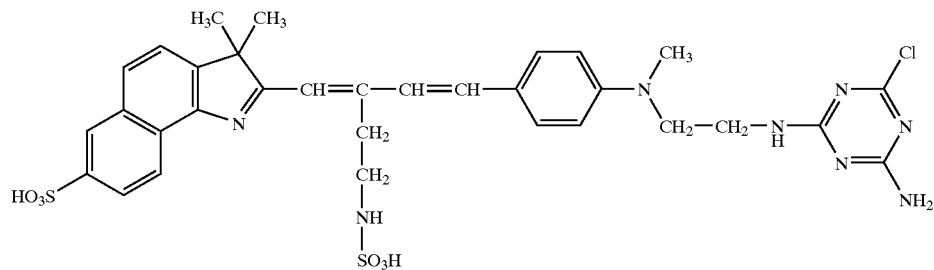

IV-c7

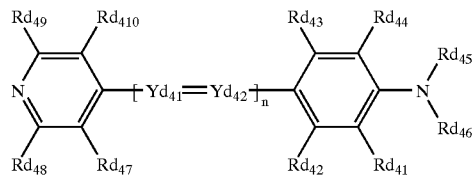

Formula 4-d in which $Rd_{41}$ to $Rd_{410}$ independently of one another represent any substituent, $Yd_{41}$ and $Yd_{42}$ independently of one another represent substituted or unsubstituted C or N, where the substituents may also form a 5- or 6-membered aliphatic or aromatic carbo- or heterocycle, n may represent 0, 1, 2, 3, 4 or 5 with the proviso that at least one of the substituents $Rd_{41}$ to $Rd_{410}$ is selected from the group consisting of $-(CH_2)_l-SO_2-Z-SO_2-R$, $-(CH_2)_l-CO-Z-SO_2-R$, $-(CH_2)_l-SO_2-Z-CO-R$ and $-(CH_2)_l-N(R)-SO_3^-$, where l represents a number between 1 and 6, Z represents NH or $N^-$ and R preferably represents optionally substituted alkyl or aryl.

In a preferred embodiment, the following substituents may form a 5- or 6-membered carbo- or heterocycle which is optionally also fused:

The substituent $Rd_{45}$ together with $Rd_{46}$ and/or $Rd_{45}$ with $Rd_{44}$, and/or $Rd_{46}$ with $Rd_{41}$, and/or $Rd_{41}$ with $Rd_{42}$ and/or $Rd_{44}$ with $Rd_{43}$.

The substituent $Rd_{49}$ together with $Rd_{410}$, and/or the substituent $Rd_{48}$ together with $Rd_{47}$.

Compounds of the formula 4d which are to be used with particular preference

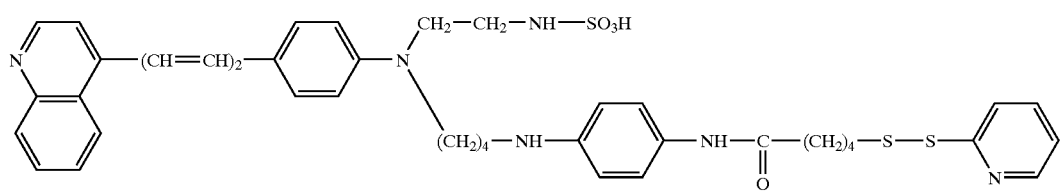

IV-d1

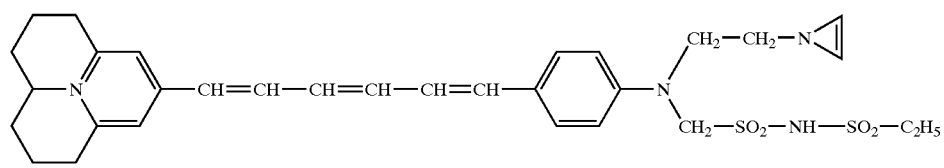

IV-d2

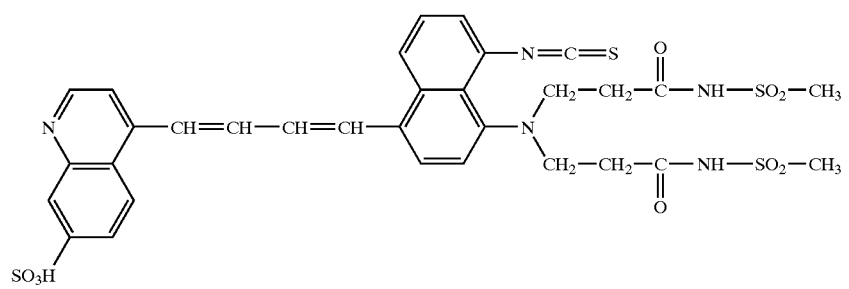

IV-d3

5. Squaric Acids

For the purpose of the present invention, squaric acids that are to be used with preference are those of the formula 5a, 5b and 5c

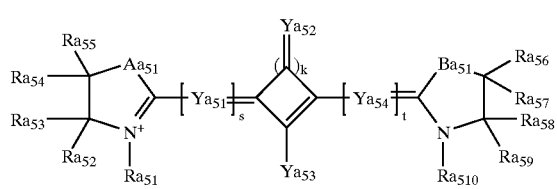

Formula 5-a in which

Ra$_{51}$ to Ra$_{510}$ independently of one another may represent any substituent, Ya$_{51}$, Ya$_{54}$ independently of one another substituted or unsubstituted C or N, where the substituents may also form a 5- or 6-membered aliphatic or aromatic carbo- or heterocycle.

s and t independently of one another represent 0, 1, 2 or 3, k represents 1 or 2, Ya$_{52}$ represents O, S, or =NRa$_{511}$, Ya$_{53}$ represents O—Ra$_{512}$, S—Ra$_{513}$ or N(Ra$_{514}$)(Ra$_{515}$), where Ra$_{511}$ to Ra$_{515}$ independently of one another may represent any substituent Aa$_{51}$ and Ba$_{51}$ independently of one another represent O, S, Se, Te, N—Ra$_{516}$, C(Ra$_{517}$)(Ra$_{518}$) or —C(Ra$_{519}$)=C(Ra$_{520}$)—, where Ra$_{516}$ to Ra$_{520}$ may represent any substituent, preferably H, optionally substituted alkyl, aryl or alkenyl, having up to 20 C atoms, with the proviso that at least one of the substituents Ra$_{51}$ to Ra$_{520}$ selected from the group consisting of —(CH$_2$)$_1$—SO$_2$—Z—R, —(CH$_2$)$_1$—CO—Z—SO$_2$—R, —(CH$_2$)$_1$—SO$_2$—Z—CO—R and —(CH$_2$)$_1$—N(R)—SO$_3^-$, where 1 is a number between 1 and 6, Z represents NH or N$^-$ and R preferably represents optionally substituted alkyl or aryl.

In a preferred embodiment, the substituents Ra$_{52}$ to Ra$_{55}$ or Ra$_{56}$ form the remaining members of a carbo- or heterocyclic ring system which may contain up to 4 rings which may optionally carry a plurality of substituents. Ra$_{52}$ together with Ra$_{55}$ and/or Ra$_{56}$ together with Ra$_{59}$ may form a π bond and Ra$_{53}$ and Ra$_{54}$ or Ra$_{57}$ and Ra$_{58}$ may represent substituents.

Particularly preferred compounds of the formula 5a

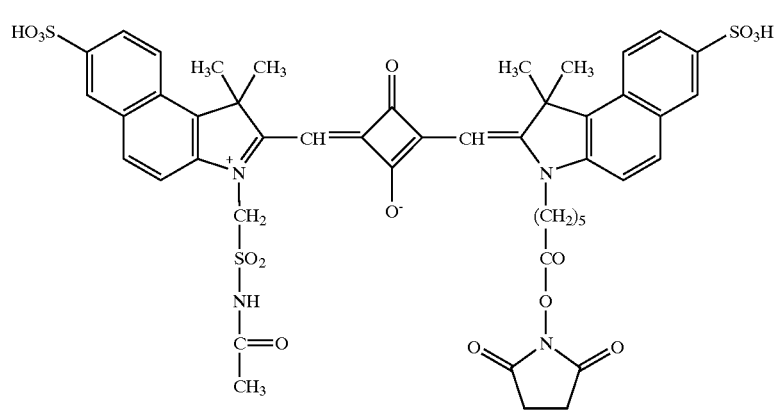

V-a1

V-a2
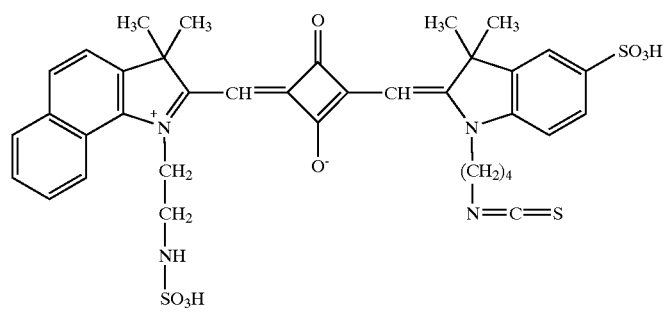
V-a3
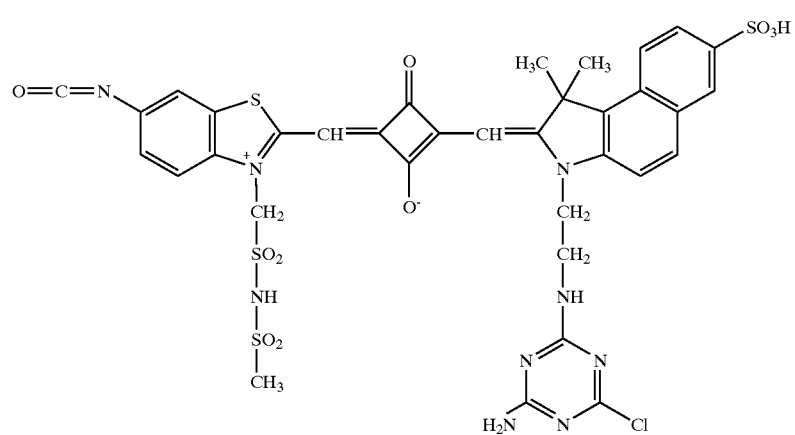
V-a4
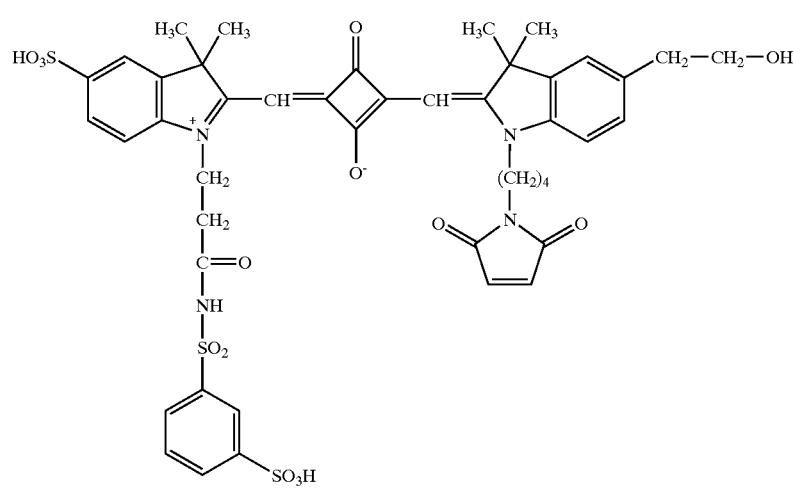
V-a5
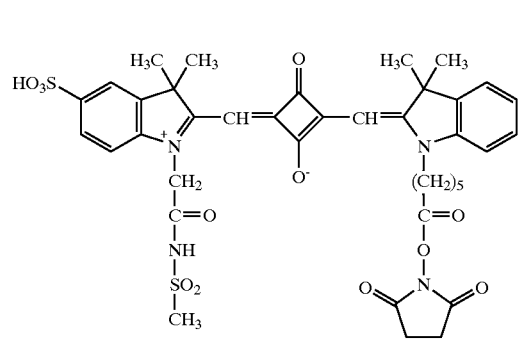
V-a6
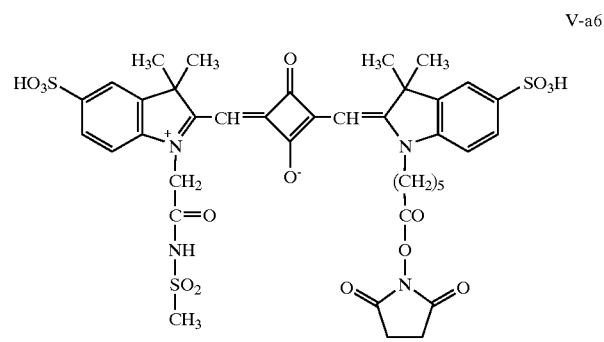

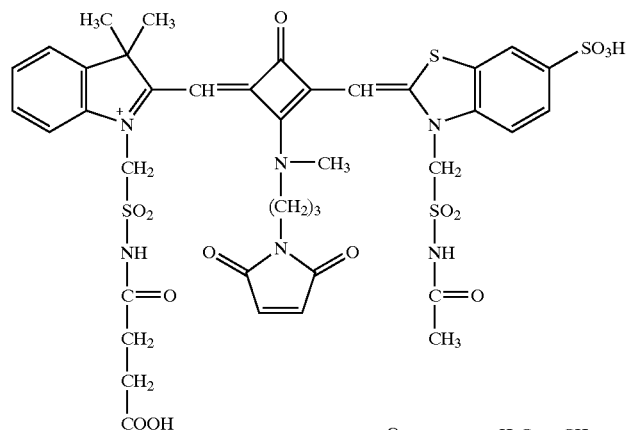
V-a7
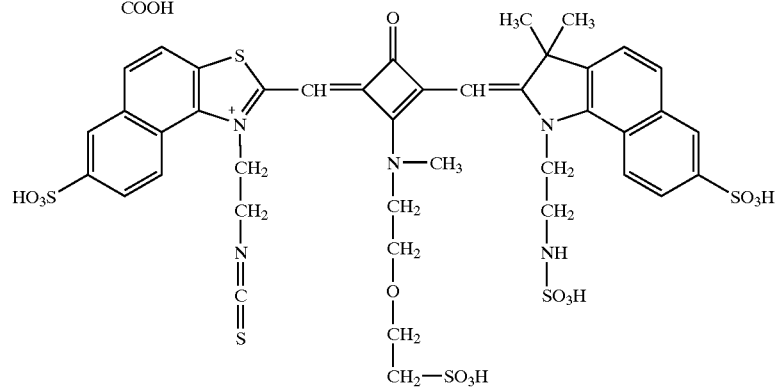
V-a8
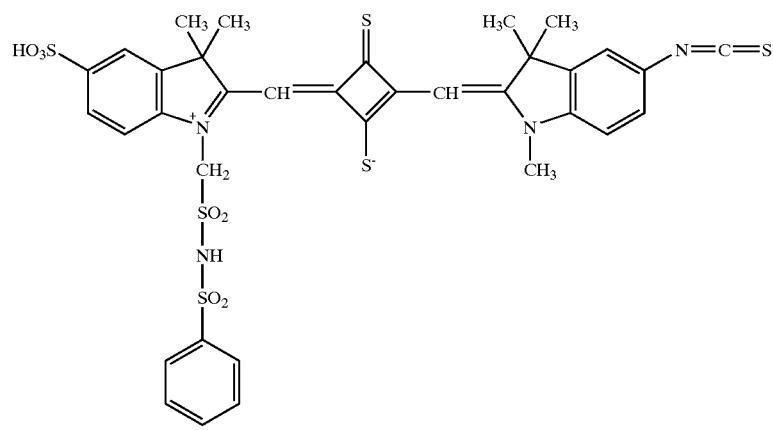
V-a9
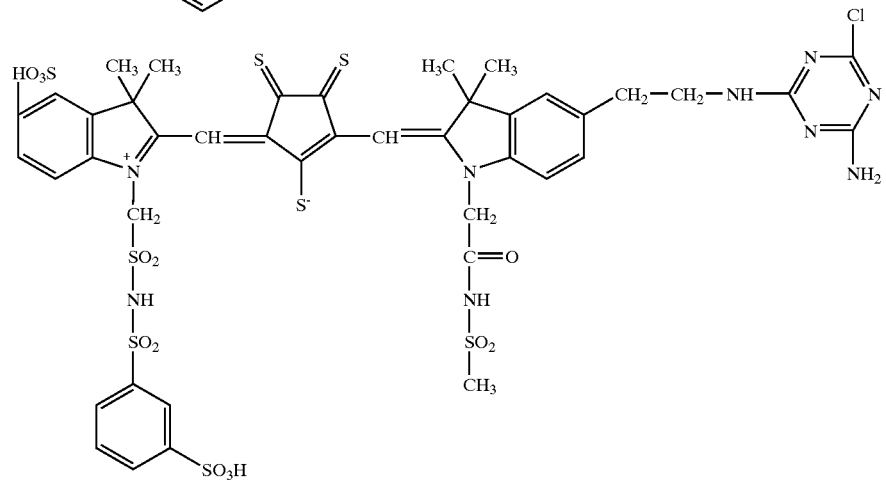
V-a10

-continued

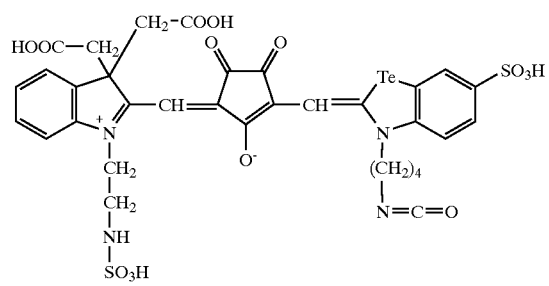
V-a11

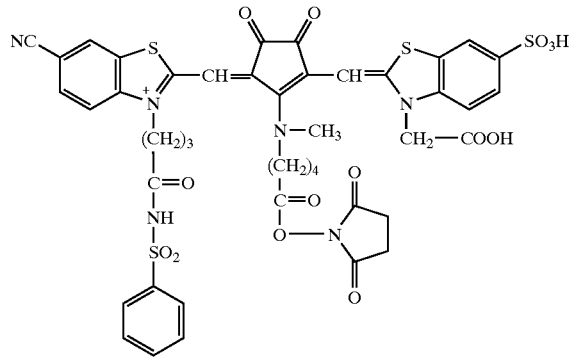
V-a12

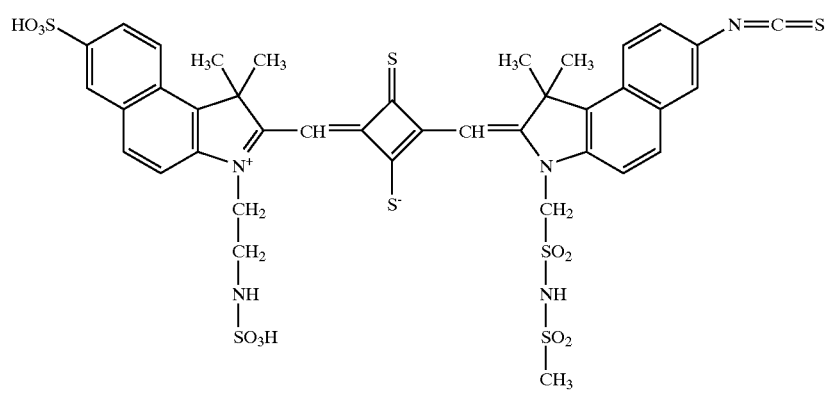
V-a13

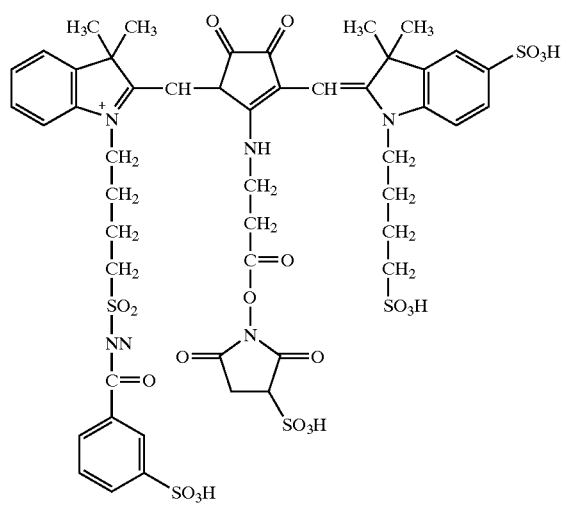

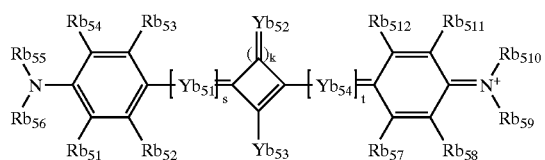
Formula 5-b in which
- $Rb_{51}$ to $Rb_{512}$ independently of one another may represent any substituent,
- $Yb_{51}$ to $Yb_{54}$ independently of one another substituted or unsubstituted C or N, where the substituents may also form a 5- or 6-membered aliphatic or aromatic carbo- or heterocycle.
- s and t independently of one another represent 0, 1, 2 or 3,
- k represents 1 or 2,
- $Yb_{52}$ represents O, S, or $=NRb_{513}$,
- $Yb_{53}$ represents $O-Rb_{514}$, $S-Rb_{515}$ or $N(Rb_{516})(Rb_{517})$, where $Rb_{513}$ to $Rb_{517}$ independently of one another may represent any substituent, with the proviso that at least one of the substituents $Rb_{51}$ to $Rb_{517}$ is selected from the group consisting of $-(CH_2)_1-SO_2-Z-SO_2-R$, $-(CH_2)_1-CO-Z-SO_2-R$, $-(CH_2)_1-SO_2-Z-CO-R$ and $-(CH_2)_1-N(R)-SO_3^-$, where
- l is a number between 1 and 6,
- Z represents NH or $N^-$ and
- R preferably represents optionally substituted alkyl or aryl.

In a preferred embodiment, the following substituents may form a 5- or 6-membered carbo- or heterocycle which is optionally also fused:

The substituent $Rb_{55}$ together with $Rb_{56}$ and/or $Rb_{55}$ and $Rb_{54}$, and/or $Rb_{56}$ with $Rb_{51}$, and/or $Rb_{51}$ with $Rb_{52}$ and/or $Rb_{54}$ with $Rb_{53}$.

The substituent $Rb_{59}$ together with $Rb_{58}$ or $Rb_{510}$ together with Rb511, the substituent $Rb_{511}$ together with $Rb_{512}$ and/or the substituent $Rb_{58}$ together with $Rb_{57}$.

Particularly preferred compounds of the formula V-b1

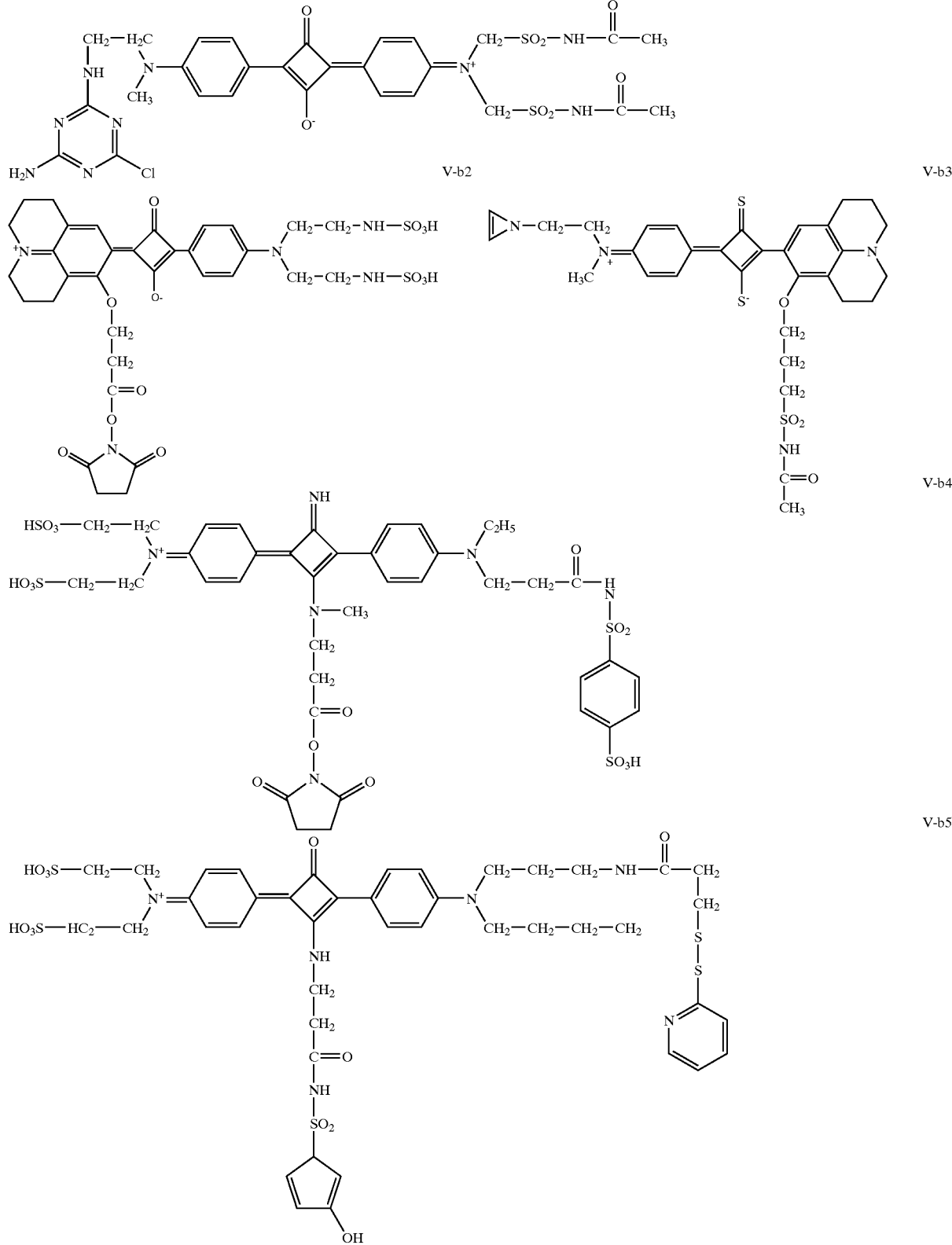

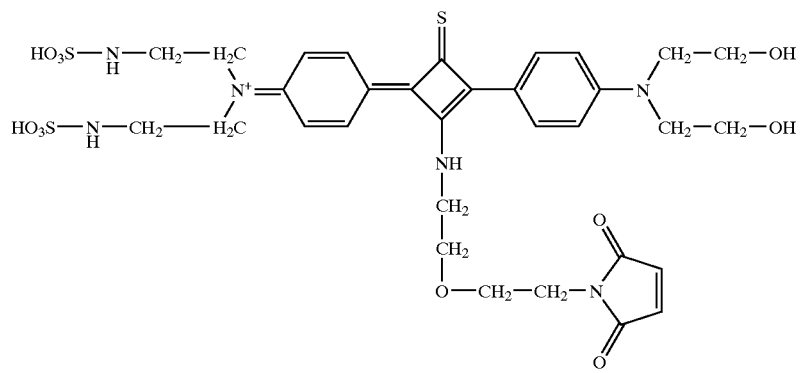
V-b6
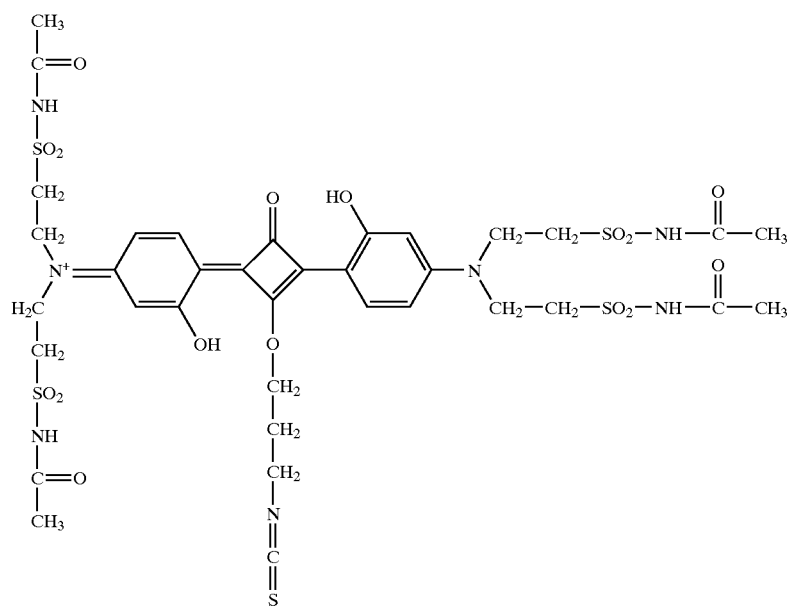
V-b7
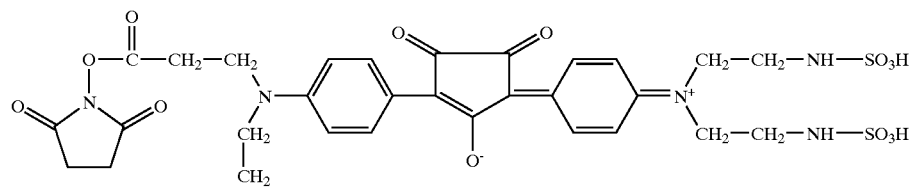
V-b8
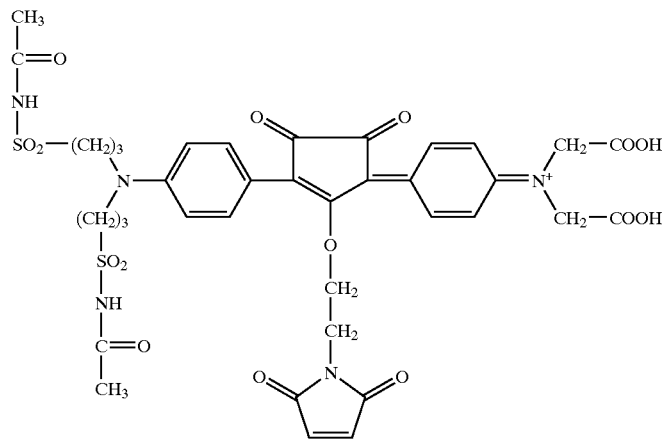
V-b9

-continued

V-b10

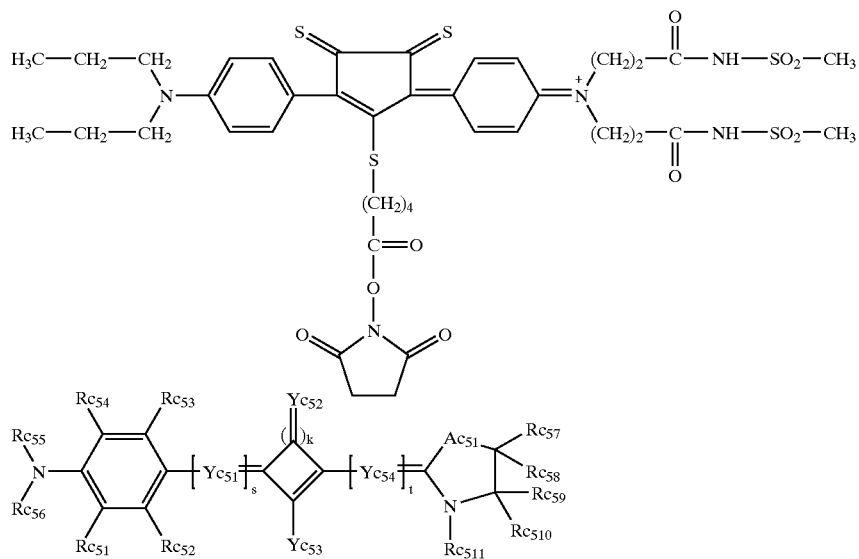

in which
Rc$_{51}$ to Rc$_{511}$ independently of one another may represent any substituent Yc$_{51}$ to Yc$_{54}$ independently of one another substituted or unsubstituted C or N, where the substituents may also form a 5- or 6-membered aliphatic or aromatic carbo- or heterocycle.

s and t independently of one another represent 0, 1, 2 or 3, k represents 1 or 2, Yc$_{52}$ represents O, S or =NRc$_{512}$, Yc$_{53}$ represents O—Rc$_{513}$, S—Rc$_{514}$ or N(Rc$_{515}$)(Rc$_{516}$), Ac$_{51}$ represents O, S, Se, Te, N—Rc$_{517}$, C(Rc$_{518}$)(Rc$_{519}$) or —C(Rc$_{520}$)=C(Rc$_{521}$)—, where Rc$_{512}$ to Rc$_{521}$ represent any substituent, preferably H, optionally substituted alkyl, aryl or alkenyl, having up to 20 C atoms, with the proviso that at least one of the substituents Rc$_{51}$ to Rc$_{521}$ is selected from the group consisting of —(CH$_2$)$_1$—SO$_2$—Z—SO$_2$—R, —(CH$_2$)$_1$—CO—Z—SO$_2$—R, —(CH$_2$)$_1$—SO$_2$—Z—CO—R and —(CH$_2$)$_1$—N(R)—SO$_3^-$, where
1 is a number between 1 and 6,
Z represents NH or N$^-$ and
R preferably represents optionally substituted alkyl or aryl.

In a preferred embodiment, the following substituents may form a 5- or 6-membered carbo- or heterocycle which is optionally also fused:

The substituent Rc$_{55}$ together with Rc$_{56}$ and/or Rc$_{55}$ with Rc$_{54}$, and/or Rc$_{56}$ with Rc$_{51}$, and/or Rc$_{51}$ with Rc$_{52}$ and/or Rc$_{54}$ with Rc$_{53}$.

The substituents Rc$_{57}$ to Rc$_{510}$ preferably from the remaining members of a carbo- or heterocyclic ring system which may contain up to 4 rings which may optionally carry a plurality of substituents. Rc$_{58}$ together with Rc$_{59}$ may form a π bond and Rc$_{57}$ and Rc$_{510}$ may represent substituents.

Particularly preferred compounds of the formula 5c

Formula 5-c

V-c1

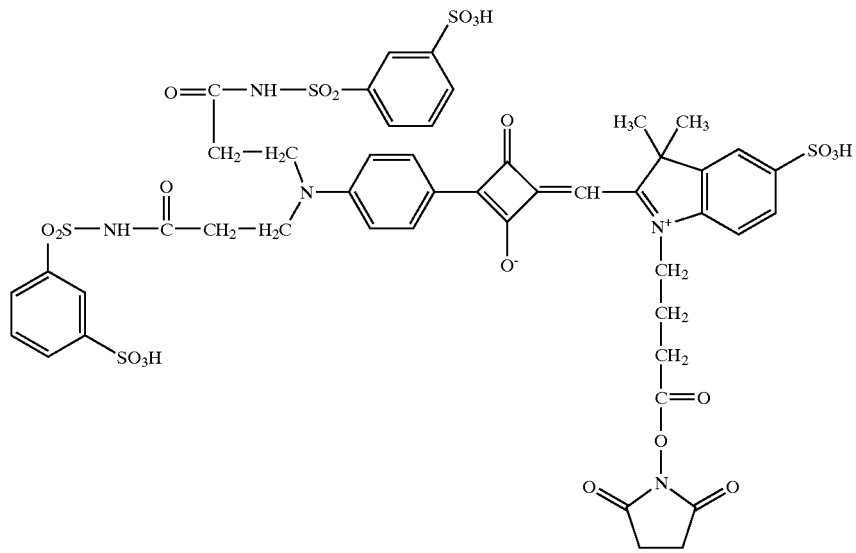

V-c2
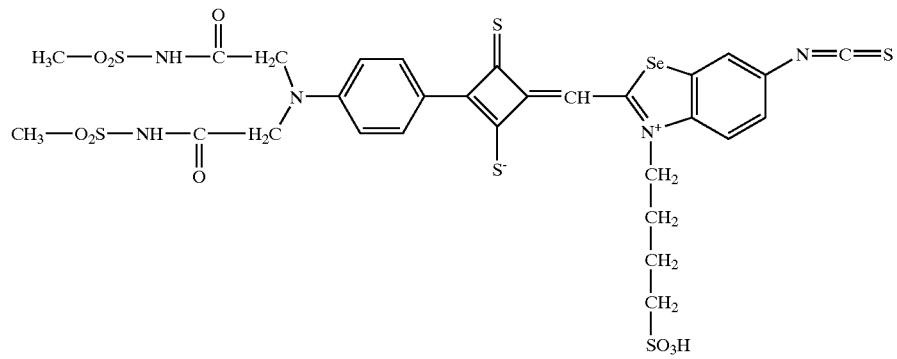
V-c3
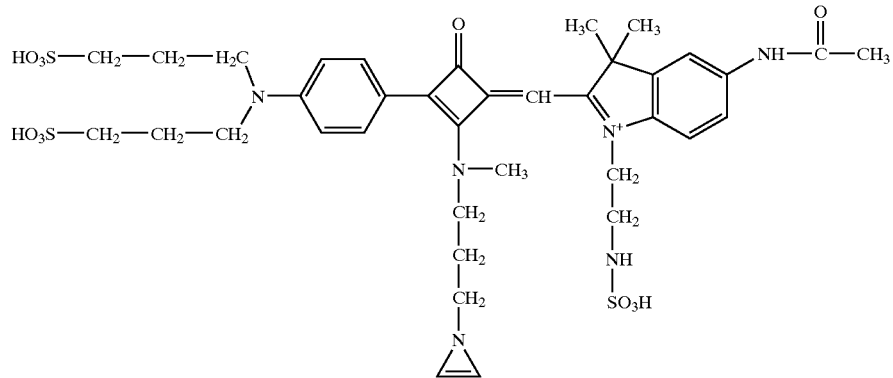
V-c4
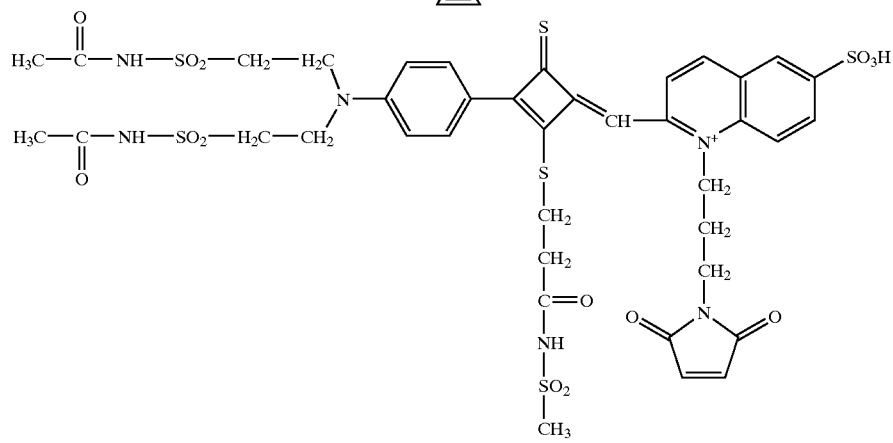
V-c5
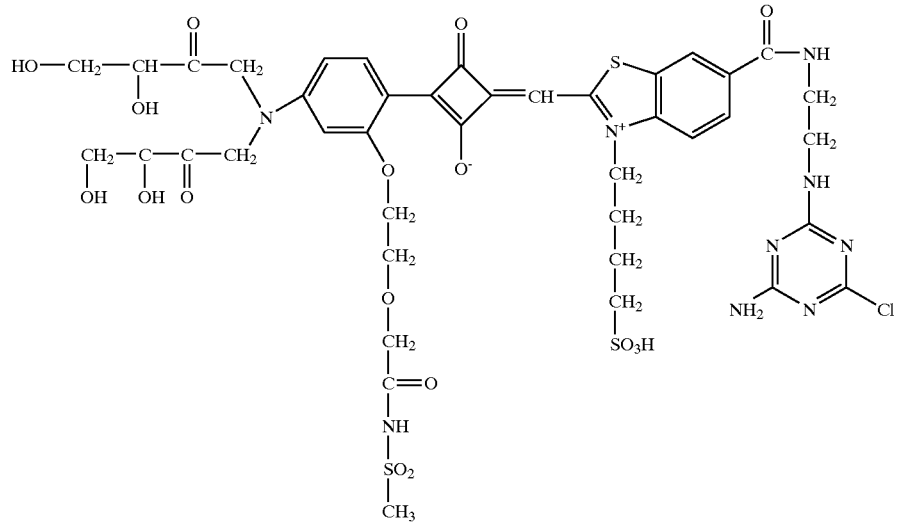

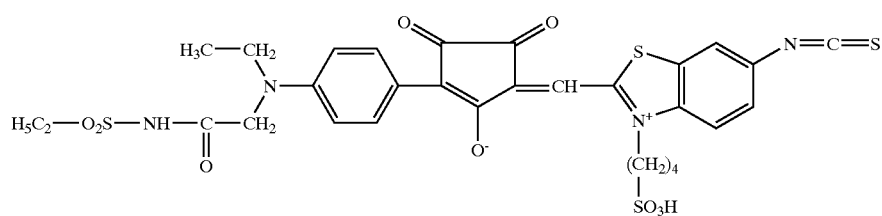

V-c6

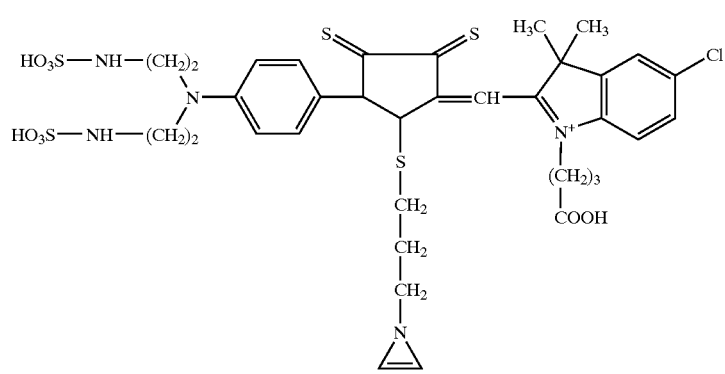

V-c7

For the purpose of the present application, substituents are to be understood as meaning, for example, halogens, such as, in particular F, Cl or Br, furthermore alkoxy, alkylthio, aryloxy, arylthio, acylamino, alkylsulfonamido, alkylsulfamoyl, alkylcaramoyl, arylsulfonamido, arylsulfamoyl, arylcarbamoyl, alkyl, alkenyl, aryl, hetaryl, arylene, hetarylene, alkylene, alkoxycarbonyl, ureido or cyano groups. Preference is furthermore given to substituted and also non-substituted cycloalkyl and also to substituted and non-substituted aryl, in particular phenyl groups; particularly preferred substituents are optionally substituted alkyl, aryl, sulfoalkyl, carboxyalkyl, —(CH$_2$)$_1$—SO$_2$—Z—SO$_2$—R, —(CH$_2$)$_1$—CO—Z—SO$_2$—R, —(CH$_2$)$_1$—SO$_2$—Z—CO—R, —(CH$_2$)$_1$—N(R)—SO$_3^-$, where 1 represents a number between 1 and 6 and Z represents NH or N$^-$ and R preferably represents optionally substituted alkyl or aryl.

For the purpose of the present invention, alkenyl is to be understood as meaning linear or branched, cyclic or straight-chain, substituted or non-substituted unsaturated hydrocarbon radicals, such as, for example, ethenyl, 2-propenyl, isopropenyl.

For the purpose of the present application, carbo- or heterocyclic ring systems are to be understood as meaning ring systems consisting of, preferably 4, 5, 6, 7 or 8 carbon atoms, where up to 3 carbon atoms may be replaced by heteroatoms such as, in particular, N, O, SE or S. The ring systems may be aliphatic or aromatic rings; preferably, 2, 3 or 4 identical or different rings may also be present as a fused system. For the purpose of the present application, carbocyclic aromatic groups are to be understood as meaning, preferably, 5- or 6-membered fused and/or substituted ring systems, in particular phenyl and naphthyl. Unsaturated heterocyclic groups are to be understood as meaning, preferably, 5- or 6-membered ring systems which may be present in monocyclic form, but also as fused ring systems. Here, suitable heteroatoms are, in particular, N, S and O. A ring system may preferably have between 1 and 3 heteroatoms, the heteroatoms being identical or different. Preference is given to: furyl, indolyl, thienyl, pyrrolyl and carbazolyl. These groups may be unsubstited or, preferably, substituted. Here, it is also possible for carbocyclic aromatic groups and unsaturated heterocyclic groups for their part to be present as substituents, which is also meant to include the possible fusion of different ring systems.

Compounds of one of the formulae 1 to 5 which are particularly preferred according to the invention are listed below:

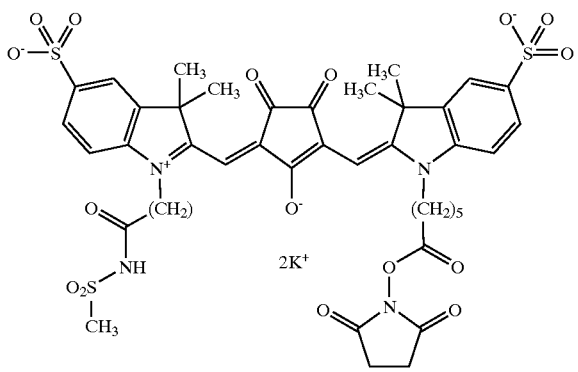

57
-continued
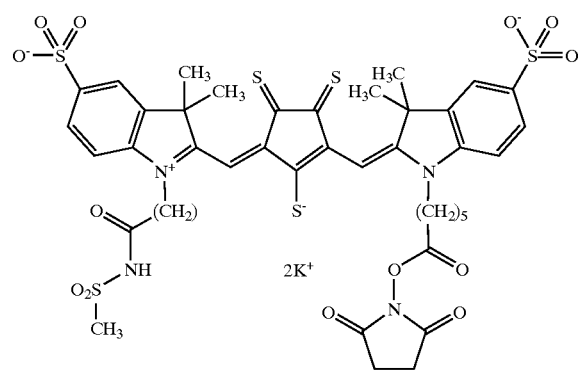
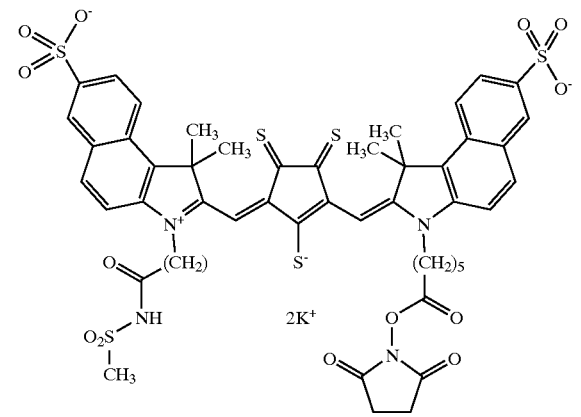
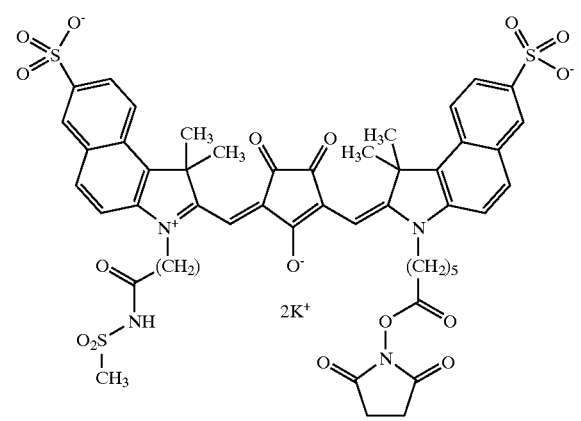
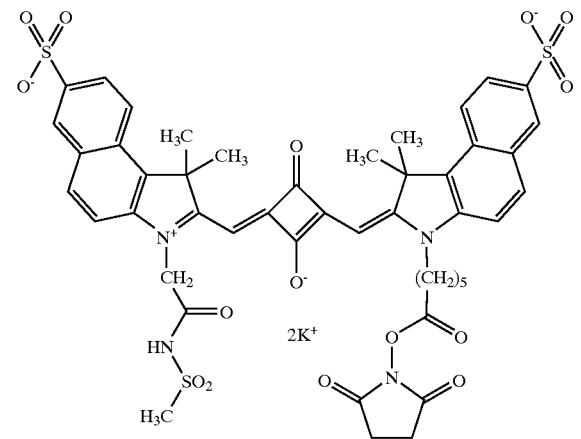
58
-continued
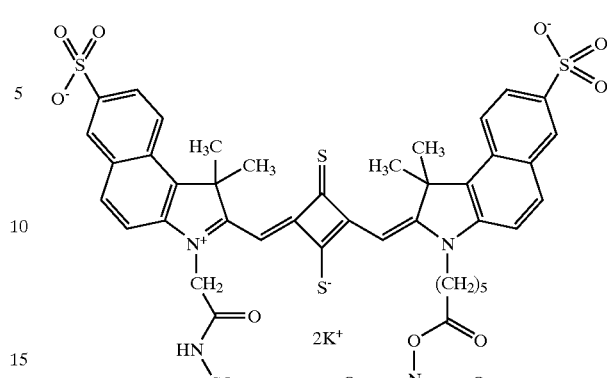
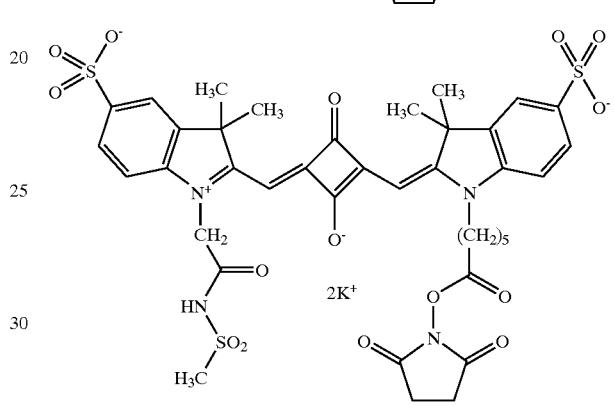
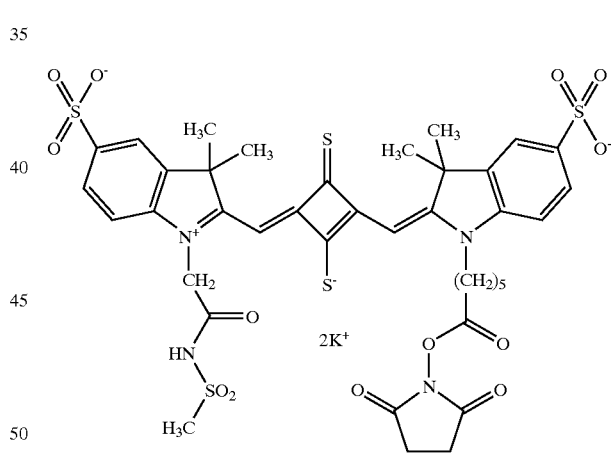
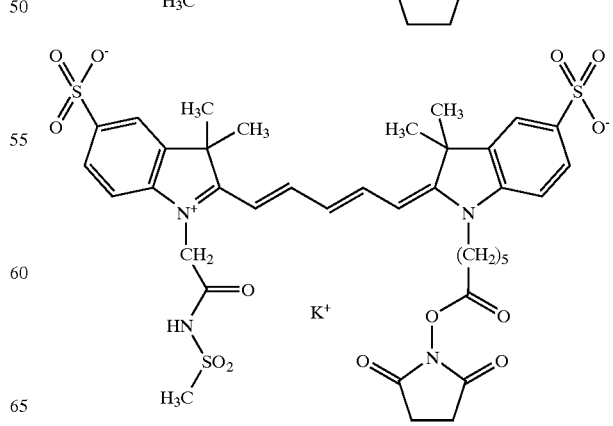

-continued

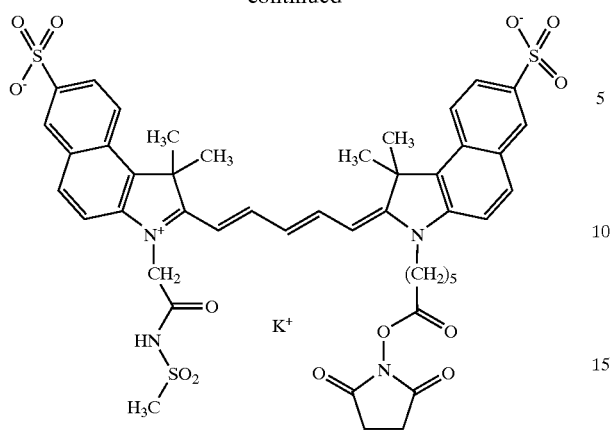

According to the invention, the dyes can also be conjugated to antibodies and used, for example, in flow cytometry. One advantage of these polymethine dyes is the fact that a dye can be tailored for virtually any wavelength between 500 and 900 nm. As a result, multicolor detection is also possible. In flow cytometry, for example, different antibodies can in each case be labeled with one fluorescent dye and then be detected simultaneously in an experiment using a suitable detection system. The specific antibodies then identify different epitopes on the cells. Using this system, it is also possible to quantify the analytes. Thus, the use of a plurality of fluorescently labeled antibodies gives a higher information content per experiment. This means a cost advantage, in particular, for example, for clinical tests.

Furthermore, it is also possible to carry out qualitative and/or quantitative detection methods by labeling of biomolecules which are interacting with each other by fluorescence resonance energy transfer.

The present invention also provides the use of the dyes for labeling DNA, RNA or nucleotide analogs such as PNA, and to this end, they can be used in nucleic acid assays. Here, usually, activated dye molecules are bound to nucleotides, nucleosides, nucleotide analogs or oligonucleotides or analogs thereof. Binding takes place via a nucleophilic group of the nucleotides or analogs which reacts with the activated dye. Customary nucleophilic groups are amino groups, thiol groups, hydoxyl groups or other groups. The activated groups are generally derivatives of carboxyl groups, such as N-hydroxysuccinimidates, isothiocyanates, maleimides or iodoacetamide derivatives. Moreover, a nucleophilic groups may react with a phosphoamidite radical, resulting in a covalent bond between the dye molecule and the biomolecule.

In further applications, the dyes can also be attached to solid phases, such as, for example, polymeric beads, or be incorporated into the same. The polymeric beads can be functionalized and for their part act as fluorescent labels in bioanalysis.

As already described, polymethine dyes which contain a group of the formula (I) are already known from photography; they are obtainable, for example, as described in EP 0 534 283, EP 0 530 511, DE 1 081 311.

In contrast, polymethine dyes which contain a group of the formula (I) and at the same time a group which renders them capable of forming covalent bonds, are selected from the group of the following compounds:

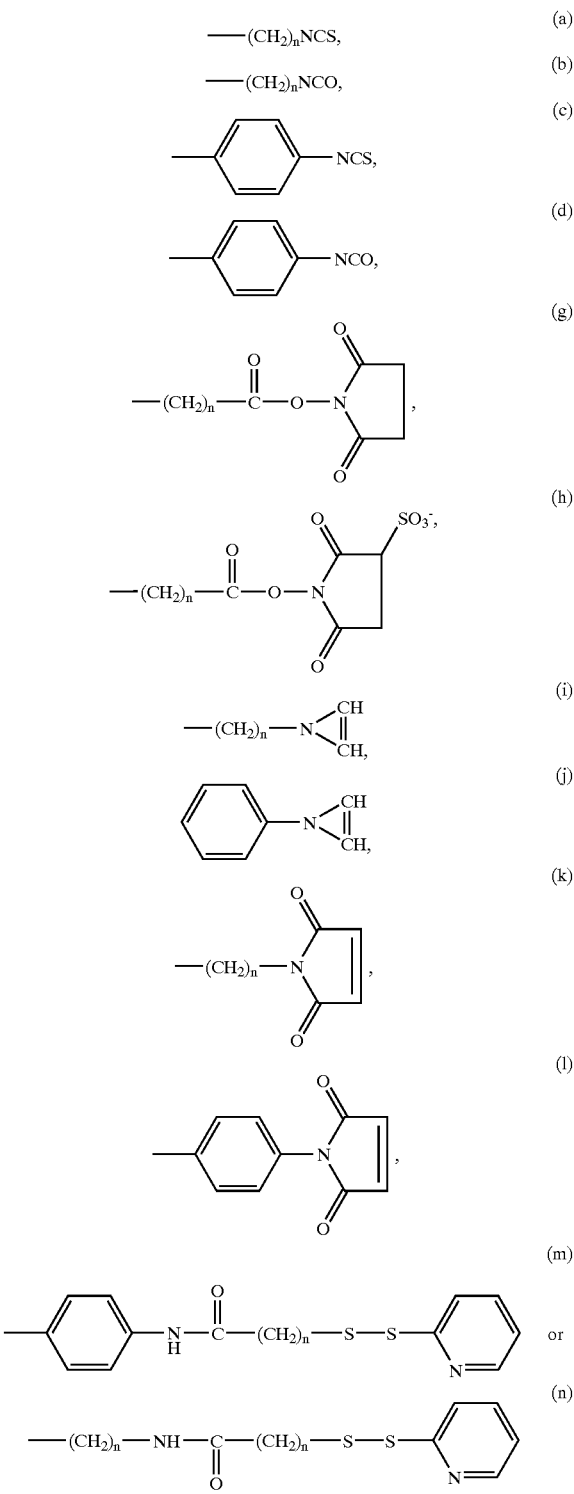

and are novel and have not yet been described in the prior art. Accordingly, hereinbelow synthesis procedures for obtaining such "activated" dyes are described:

Synthesis procedures for preparing the dyes F and J according to the invention.

1. Synthesis of F

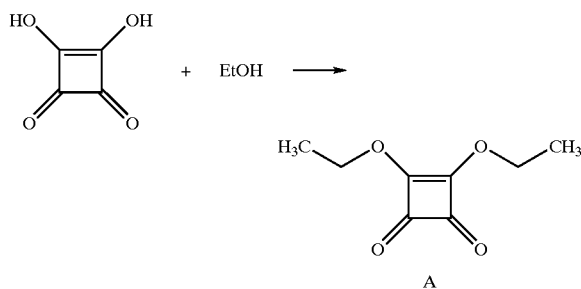

A

For 12 h, 0.15 mol of 3,4-dihydroxy-3-cyclobutene-1,2-dione in 150 mL of absolute ethanol is heated under reflux.
The reaction mixture is concentrated.
The oil is purified by column chromatography.
Mobile phase: methyl tert-butyl ether/iso-octane 50:50
Stationary phase: AMICON 35–70 mic.
Yield: 48%

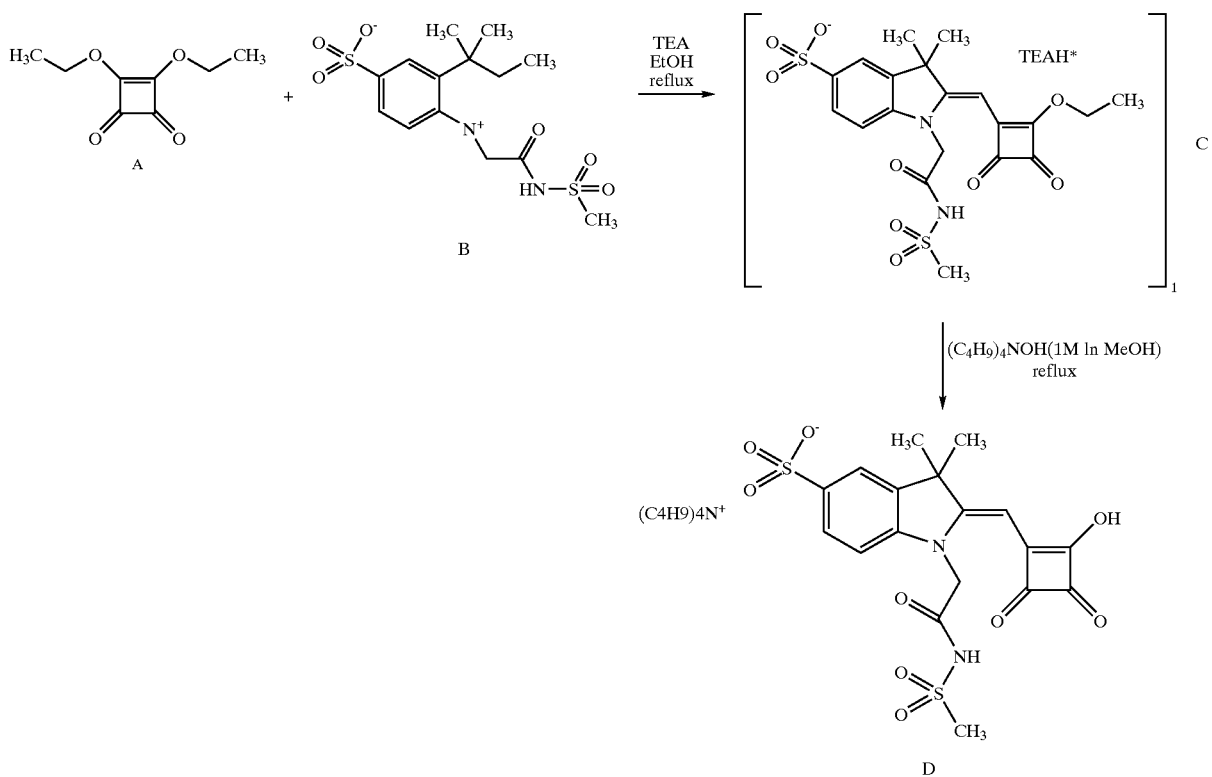

C

0.055 mol of A, 0.0068 mol of B and 0.0078 mol of triethylamine in 50 mL of absolute ethanol are boiled at reflux. After 35 min, 0.107 mol of triethylamine is added. After 3.5 h, the mixture is cooled. Ethyl acetate is added and, after vigorous stirring, the mixture is decanted. These process steps are repeated a further 3 times. This gives an oil (C).

Hydrolysis to D

The oil C in 0.145 mol of $(C_4H_9)_4NOH$ (1 M in methanol) is heated under reflux. After 30 min, the mixture is cooled. 500 ml of acetone and 16 mL of concentrated HCl are added.

The precipitated solid is filtered off. Yield: 28 g

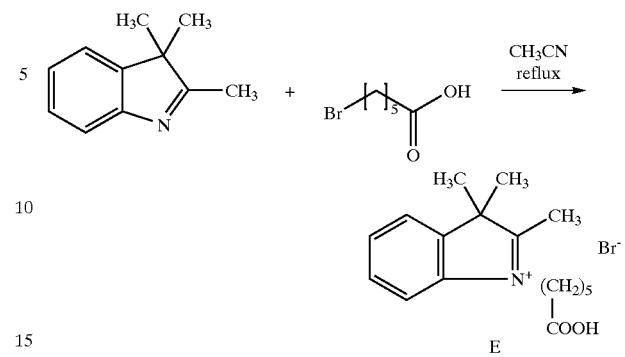

E

0.63 mol of 2,3,3-trimethylindolenine and 0.5 mol of $Br(CH_2)_5COOH$ in a small amount of acetonitrile are heated under reflux for 3 h. The temperature of the reaction mixture is 130° C. 0.5 mol of acetic acid are added and the mixture is cooled to 100° C. 250 mL of methyl ethyl ketone are then added, and the mixture is further cooled in an ice bath to 15° C. The precipitated solid is filtered off and dried at 50° C. Yield: 75%

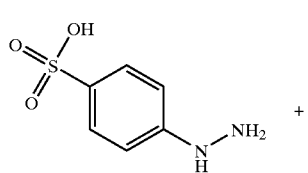

-continued

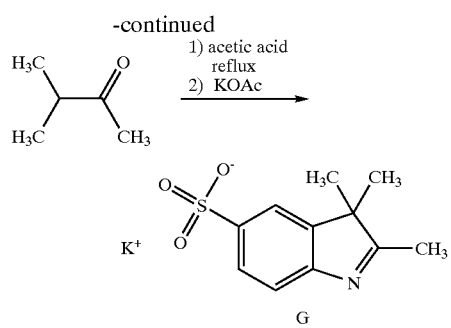

G 3.5 mol of phenylhydrazine-4-sulfonic acid and 1.9 L of acetic acid are heated at 105° C. Over the course of 30 min, 4.8 mol of 3-methyl-2-butanone are added dropwise. After 1 h 50 min, heating is removed and 4.2 mol of potassium acetate in 3.5 L of methanol are added. The mixture is further cooled in an ice bath and the precipitated solid is filtered off. It is washed with ethyl acetate. Yield: 77%

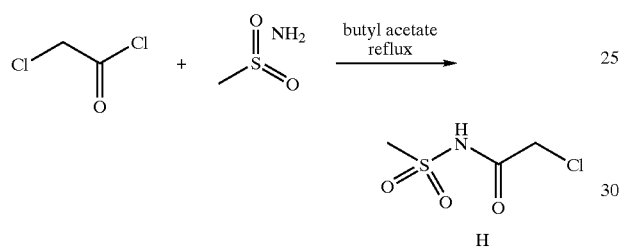

H 26.8 mol of chloroacetyl chloride and 25.5 mol of methanesulfonamide in 10.2 L of butyl acetate are slowly boiled at reflux. After 8 h, the mixture is cooled to 20° C. The precipitated solid is filtered off and stirred in 4 L of butyl acetate. The precipitated solid is dried at 50° C. in a fan-assigned drying cabinet. Yield 74%

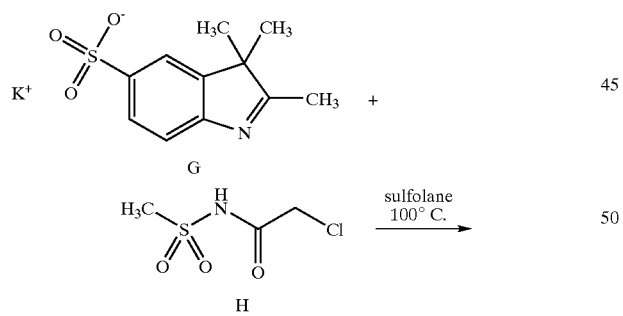

B 2.5 mol of G and 2.5 mol of H in 1.3 L of sulfolane are heated at 130° C. After 5 h and 50 min, the mixture is cooled to 50° C. 2.5 L of acetone are added and the mixture is further cooled to room temperature. The precipitated solid is filtered off and washed with acetone. The precipitated solid is stirred in 1.6 L of warm demineralized water. 1.6 L of ethanol are added and the mixture is cooled. The precipitated solid is filtered off and washed with ethanol. Yield: 53%

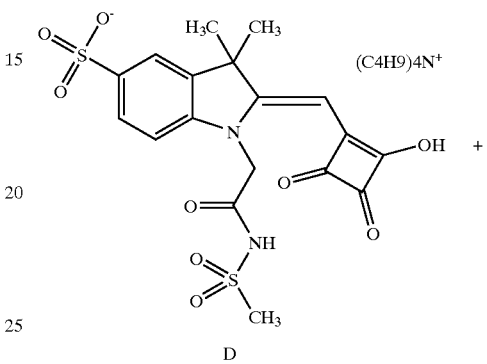

D

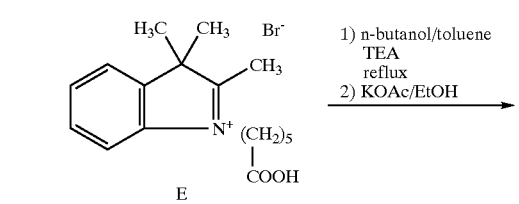

E

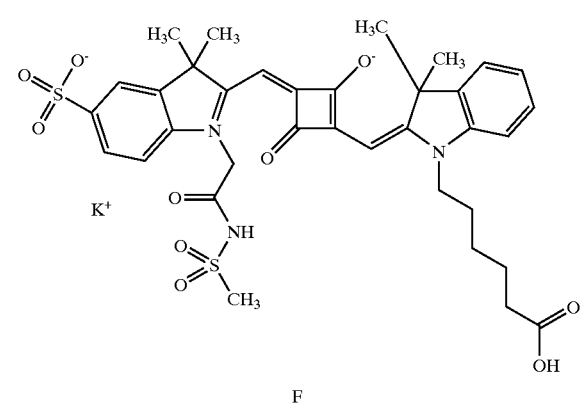

F

F

In a flask fitted with a Dean-Stark separator, 4.7 g of D, 3.5 g of E and 1.4 mL of triethylamine in n-butanol/toluene are boiled at reflux. After 2.5 h, the mixture is cooled. The mixture is extracted 3 times with water. The reaction mixture is concentrated and then redissolved in ethanol. 3 g of potassium acetate are added and the mixture is filtered off. The precipitated solid is taken up in water, and acetone is added. The solvent is decanted off and more acetone is added. These process steps are repeated until precipitation occurs. The precipitated solid is filtered off.

2. Synthesis of J

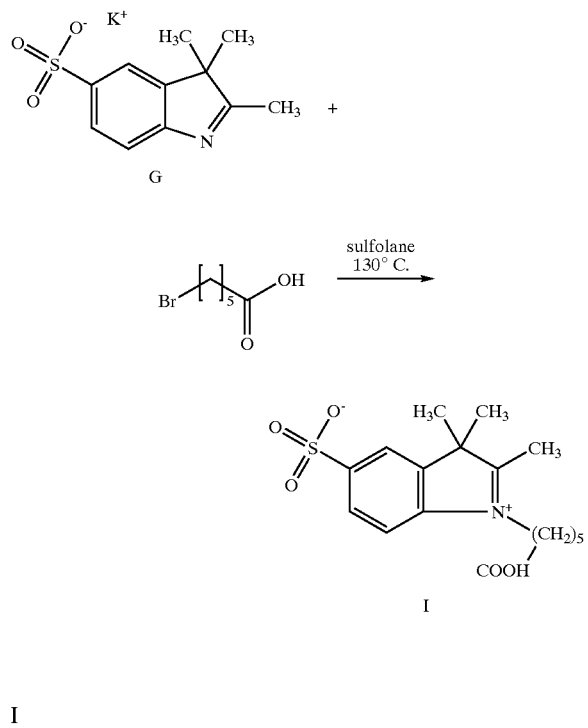

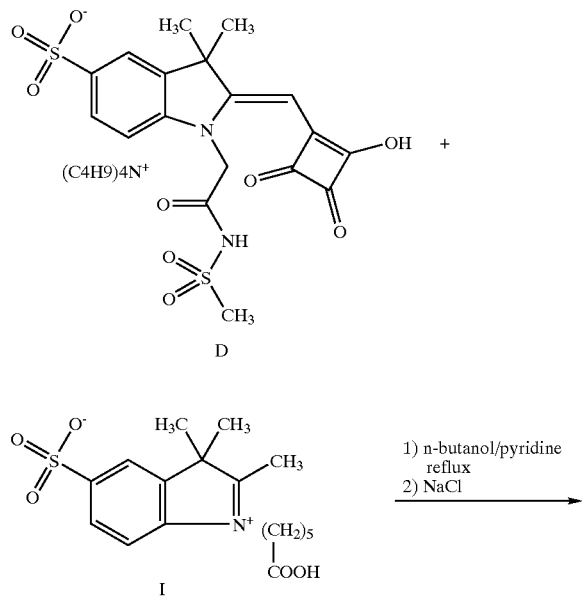

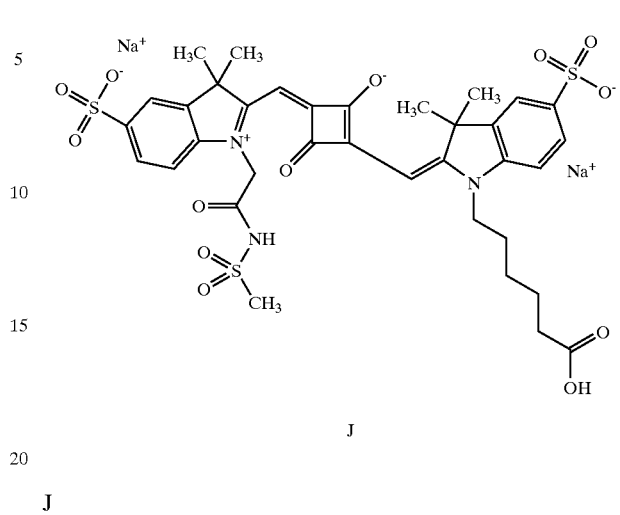

J 0.1 mol of G and 0.12 mol of Br(CH$_2$)$_5$COOH in 35 mL of sulfolane are heated at 130° C. After 3 h, 100 mL of dimethylacetamide are added and the mixture is cooled to room temperature. The precipitated solid is filtered off and, on the filter, washed with dimethylacetamide. The precipitated solid is boiled in acetone. After cooling, the mixture is filtered and the product is dried at 50° C. in a fan-assisted drying cabinet. Yield: 90%

For 2 h and 10 min, 4.7 g of D and 3.5 g of I in 80 mL of n-butanol/pyridine (7:1) are boiled at reflux. The mixture is cooled to room temperature and the precipitated solid is filtered off. On the filter, the solid is washed with n-butanol or acetone. The precipitated solid is taken up in 7 mL of demineralized water and 30 ml of acetonitrile are added with stirring. The liquid phase is decanted off and, with stirring, more acetonitrile is added. The liquid phase is decanted off and the oil is stirred with 40 mL of a saturated sodium chloride solution. The fine suspension is centrifuged and the liquid phase is decanted off. The precipitated solid is dissolved in methanol and the sodium chloride is filtered off. The filtrate is concentrated. The product is dried at 50° C. Yield: 1.57 g (18.5%)

General Procedure for Preparing Succinimidyl Esters from Polymethine Dyes Having Carboyl Functions The present procedure describes the preparation of succinimidyl esters from polymethine dyes having at least one carboxyl function. These esters can then be used for labeling biomolecules such as proteins, antibodies or nucleic acids.

0.05 mmol of dye and disuccinimidyl carbonate (1.5 equivalents per carboxyl group) are dissolved in 40 mL of DMF, and a spatula tip of dimethylaminopyridine is added. The mixture is stirred at 40° C. for 3 hours. After cooling, the supernatant is, in 1 ml aliquots, divided into glass vials. The solvent is evaporated under reduced pressure and the product is stored until use at 4° C. in the dark.

The crude product is used directly for labeling proteins.

General Procedure for Labeling Proteins

For labeling, the crude product (1 aliquot) is dissolved in 1 ml of DMF. 50 μl of this solution are pipetted to 1.5 mL (=1 mg) of an anti-HSA solution in 0.1 M carbonate buffer pH 9.2. The reaction solution is stirred at RT for 2 hours.

Using gel permeation chromatography over a Sephadex G50 column which had earlier been equilibrated with PBS, pH 7.4, the conjugate is then separated from unbound dye.

General Procedure for Labeling Oligonucleotides with Dye

The dyes can also be used for labeling DNA or RNA nucleotides or nucleotide analogs.

Dye K

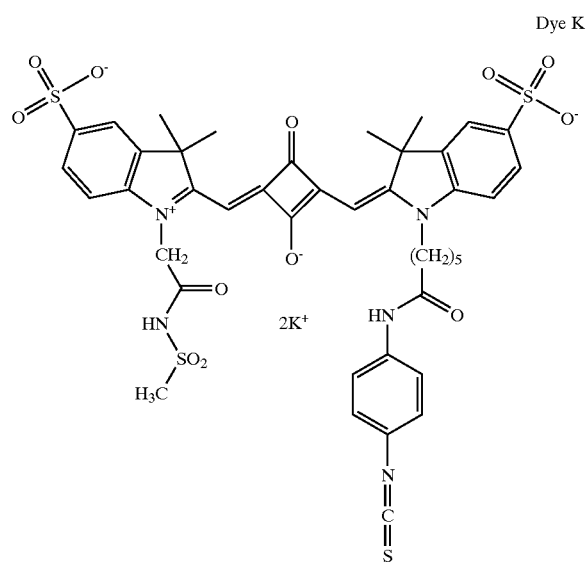

50 mmol of activated dye, for example isothiocyanate K, are dissolved in 50 ml of DMF or acetonitrile. 10 nmol of NH2-oligonucleotide are initially charged in 150 µl of 50 mM carbonate buffer, pH 9.2, and 75 nmol of dye are slowly added using a pipette. The solution was stirred at 25° C. under the exclusion of light for 3 to 5 hours.

Purification of the Oligonucleotide

Purification of the labeled oligonucleotide from unbound dye and unlabeled DNA was carried out by RP-HPLC over a C8 column. Elution was carried out using a linear gradient, for example from 70% water to 100% methanol over 30 min.

The fractions which absorbed simultaneously at 254 nm and the absorption maximum of the dye were collected, and the solvent was removed under reduced pressure.

For further use of the modified oligonucleotide, this may be separated from excess salts by ethanol precipitation.

EXAMPLES

Table 1 shows the relative quantum yields of the dyes at similar molar dye/protein ratios. The protein used was HSA (Human Serum Albumin).

TABLE 1

| Dye | D/P ratio | rel. Q.Y. | Extinction coefficient [mol-1*cm²* |
|---|---|---|---|
| Sq-1 (Ex.) | 0.36 | 0.64 | 172 000 |
| Sq-2 (Ex.) | 0.40 | 1.0 | 234 000 |
| F (inv) | 0.37 | 1.35 | 420 000 |
| J (Inv) | 0.46 | 1.36 | 240 000 |

Determination of the Molar Dye/protein Coefficient

The protein concentration is determined using the BCA method of Pierce (literature: Bradford, M. M.; Anal. Biochem. (1976) 72, 248–254). A calibration curve for anti-HSA had been prepared beforehand.

The dye concentration is determined via the absorption spectrum.

Determination of the Quantum Yield

The quantum yield was determined relative to Cy5

Determination of the Extinction Coefficient

The extinction coefficient was determined assuming that Beer's law applies.

Labeling of Activated Dye F to Anti-HAS

For labeling, the crude product (1 aliquot) is dissolved in 1 ml of DMF. 50 µl of this solution are pipetted to 1.5 mL (=1 mg) of anti-HSA solution in carbonate buffer pH 9.2. The reaction solution is stirred at RT under the exclusion of light for 2 hours.

Using gel permeation chromatography over a Sephadex G25 column, the conjugate is then separated from unbound dye. The elution buffer used is PBS, pH 7.4.

Protein conjugates of other dyes, which are listed in Table 1, were prepared in an analogous manner.

Table 1 shows that the dyes according to the invention have higher quantum yields and extinction coefficients than, for example, Cy5. Accordingly, they are particularly suitable for use as fluorescent markers in bioanalysis.

The dye conjugates of the dyes according to the invention show a lower tendency to form aggregates than polymethine dyes which have hitherto been customary. This becomes evident in Table 2.

TABLE 2

| | Absorption monomer/absorption dimer | | |
|---|---|---|---|
| | Water | 2.0 M NaCl | 3.8 M NaCl |
| CY5 | 3.12 | 3.18 | 3.19 |
| Sq-3 | 2.98 | 2.14 | 1.78 |
| Sq-1 | 4.65 | 4.48 | 3.40 |
| Sq-2 | 2.96 | 2.98 | 1.36 |
| F | 2.89 | 2.81 | 2.81 |
| J | 4.40 | 4.35 | 4.40 |

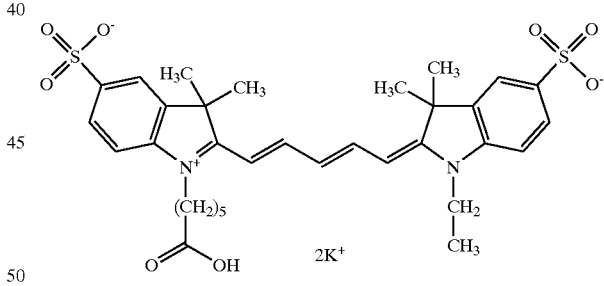

CY5

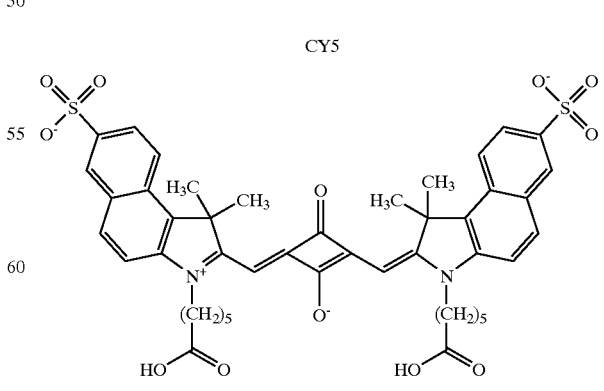

Sq-1

TABLE 2-continued

Absorption monomer/absorption dimer

| | Water | 2.0 M NaCl | 3.8 M NaCl |
|---|---|---|---|

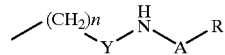

Sq-2

Sq-3

The intensity of the absorption in the absorption maximum of the monomer is a relative measure for the concentration of the monomer in the solution, the same also applies to the concentration of the aggregate, this can be correlated to the intensity of the absorption in the absorption maximum of the aggregate, which is shifted hypsochronically compared to the monomer.

Table 2 shows the ratio of the intensities of the absorption maxima of the monomer and aggregates. The increasing salt concentration causes an aggregate formation. Compared to CY5, the dye J according to the invention shows a considerably lower aggregate formation. Squaric acid dyes such as Sq-1 to Sq-3 have no stable characteristics with respect to aggregate formation, which increases with increasing salt concentration.

In contrast, the dyes F and J according to the invention have stable characteristics.

Photostability

The photostability was determined by exposing dye solutions to daylight. The absorption of the solutions varied between 1.4 and 1.6 O.D. The reduction of the absorption over time is a measure for the photostability of the dyes. These conditions were chosen since the handling of the dyes, too, includes manual process steps during which the dyes are exposed to daylight. In the case of CY5, it is clearly noticeable that, even after 30 min, the absorption has decreased by 12%. This is not the case for the dyes according to the invention, and the latter are thus also more user-friendly, by maintaining a stable absorption.

What is claimed is:

1. A polymethine dye, comprising at least one substituent of the formula (I)

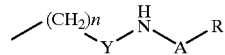    (I)

in which
n represents 1, 2, 3, 4, 5, 6, 7, 8 or 9
Y, A represent C=O or —SO$_2$, and
R represents an optionally substituted alkyl or aryl radical, and at least one substituent selected from the group consisting of —(CH$_2$)$_n$NCS,    (a)

—(CH$_2$)$_n$NCO,    (b)

    (c)

    (d)

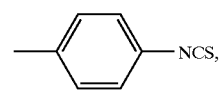    (g)

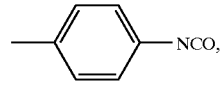    (h)

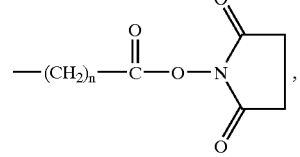    (i)

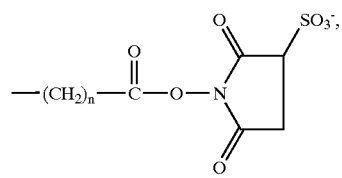    (j)

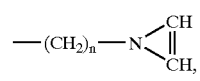    (k)

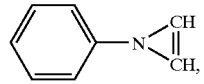    (l)

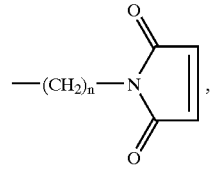    (m)

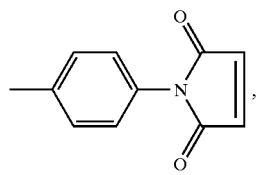 and

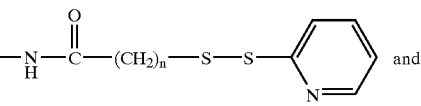

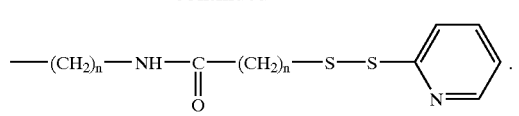

2. A polymethine dye as claimed in claim 1, wherein the polymethine dye is at least one substance selected from the group consisting of a cyanine dye, merocyanine, rhodacyanine, a styrene dye, a squaric acid dye and a crotonic acid dye.

3. A method of using the polymethine dye as claimed in claim 1 wherein said dye is contacted with at least one biomolecule to label the biomolecule by covalent binding.

4. A method of using the polymethine dye as claimed in claim 1, wherein the dye is contacted with at least one biomolecule to stain at least a portion of the biomolecule.

5. A method of using at least one of the following compounds

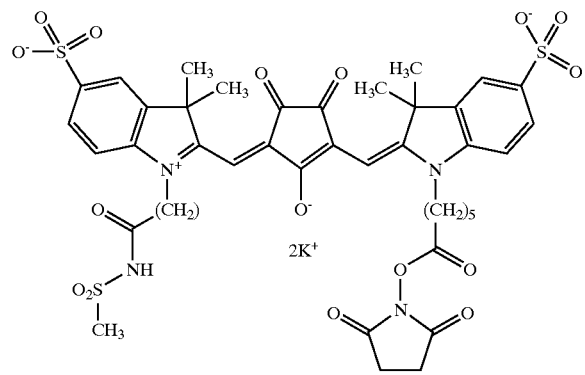

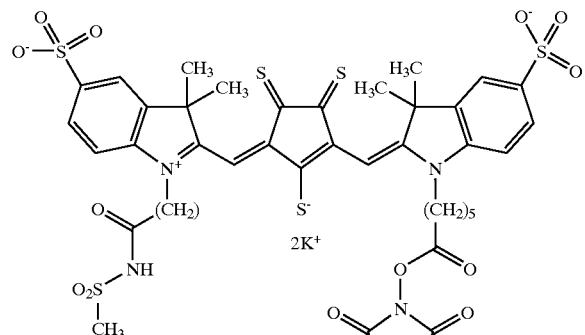

Naphthole Croconium Dyes

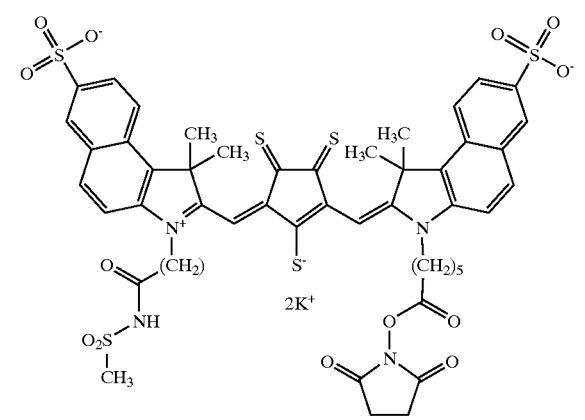

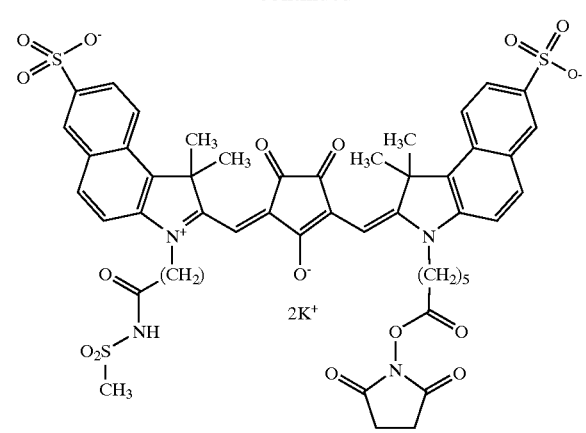

Naphthole Squaraines

73
-continued
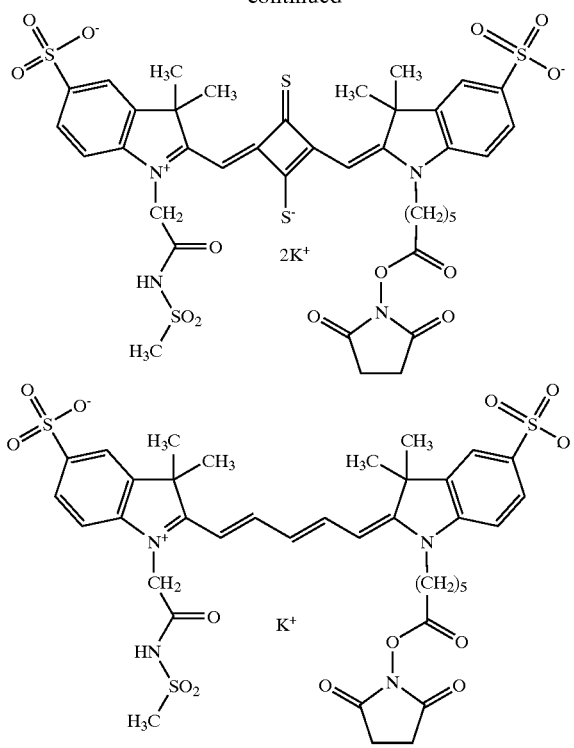
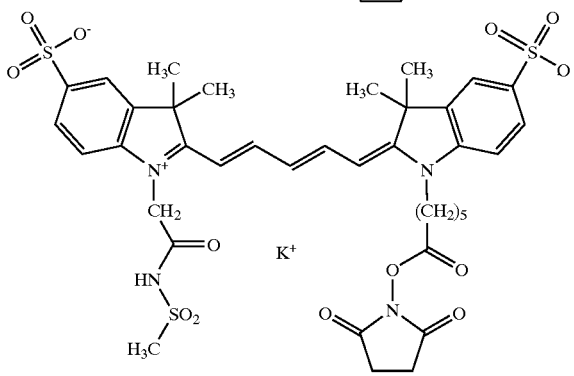
74
-continued
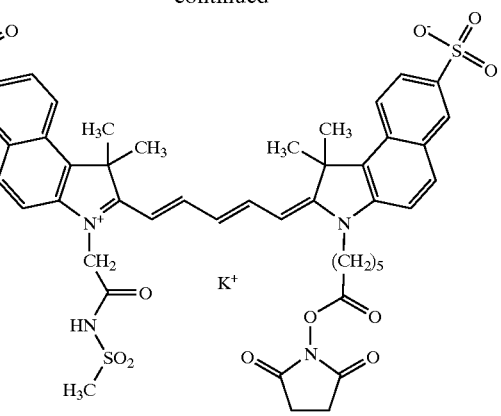
wherein said compounds are contacted with at least one biomolecule to label at least a portion of the biomolecule.
* * * * *

UNITED STATES PATENT AND TRADEMARK OFFICE
CERTIFICATE OF CORRECTION

PATENT NO.        : 6,995,262 B1                                          Page 1 of 1
APPLICATION NO.   : 10/048775
DATED             : February 7, 2006
INVENTOR(S)       : Geert Deroover et al.

It is certified that error appears in the above-identified patent and that said Letters Patent is hereby corrected as shown below:

On Title Page, Item (57), Col. 2

In the Abstract, line 1, "The invention relates to a novel polymethine dyes"

should read -- The invention relates to novel polymethine dyes --.

Signed and Sealed this

Fifth Day of September, 2006

JON W. DUDAS
*Director of the United States Patent and Trademark Office*